(12) United States Patent
Huang

(10) Patent No.: US 9,733,387 B2
(45) Date of Patent: Aug. 15, 2017

(54) GEOLOGICAL EXPLORATION METHOD FOR MAKING PLAN AND ELEVATION DRAWINGS DIRECTLY BY ROTATIONAL TIN NETWORK AND NON PROFILING METHOD

(76) Inventor: Guizhi Huang, Heilongjiang (CN)

(*) Notice: Subject to any disclaimer, the term of this patent is extended or adjusted under 35 U.S.C. 154(b) by 732 days.

(21) Appl. No.: 14/114,654

(22) PCT Filed: Feb. 13, 2012

(86) PCT No.: PCT/CN2012/000170
§ 371 (c)(1),
(2), (4) Date: Oct. 29, 2013

(87) PCT Pub. No.: WO2012/146047
PCT Pub. Date: Nov. 1, 2012

(65) Prior Publication Data
US 2014/0081614 A1   Mar. 20, 2014

(30) Foreign Application Priority Data

Apr. 29, 2011  (CN) .......................... 2011 1 0110090

(51) Int. Cl.
G06F 7/60 (2006.01)
G06G 7/48 (2006.01)
G01V 9/00 (2006.01)
E21B 49/00 (2006.01)

(52) U.S. Cl.
CPC .............. *G01V 9/00* (2013.01); *E21B 49/00* (2013.01)

(58) Field of Classification Search
CPC .................................. G01V 9/00; E21B 49/00
USPC ....................................................... 703/2, 10
See application file for complete search history.

(56) References Cited

U.S. PATENT DOCUMENTS

| 8,731,889 | B2 * | 5/2014 | Du | E21B 43/267 703/10 |
| 8,793,113 | B2 * | 7/2014 | Marza | G06T 17/05 703/10 |
| 2011/0320182 | A1 * | 12/2011 | Dommisse | G01V 1/34 703/10 |

FOREIGN PATENT DOCUMENTS

| CN | 1797030 A | 7/2006 |
| CN | 1854762 A | 11/2006 |
| CN | 101813789 A | 8/2010 |
| CN | 101906965 A | 12/2010 |

OTHER PUBLICATIONS

List of mathematical symbols—Wikipedia, printed Aug. 1, 2016, pp. 1-26.*
Mathematical symbols list, available at http://www.rapidtables.com/math/symbols/Basic_Math_Symbols.htm#basic, printed Aug. 1, 2016, pp. 1-12.*

(Continued)

*Primary Examiner* — Kamini S Shah
*Assistant Examiner* — Juan Ochoa
(74) *Attorney, Agent, or Firm* — Maier & Maier, PLLC

(57) ABSTRACT

A set of geological exploration methods of using the non-section methods and rotary networks formed by triangulated irregulars. It aims to directly construct high-precision three-dimensional models, plans and sections for solving the drawbacks of existing geological exploration methods, such as the dispersion of drill holes, the faults tracking, the controlling of structures, minelayers/stratum/ore bodies, the bending correction of drill holes, and the geological map-making methods.

5 Claims, 12 Drawing Sheets

(56) References Cited

OTHER PUBLICATIONS

Wayne Peter Barnett, "Geological control on slope failure mechanisms in the open pit at the Venetia Mine", 2003, South African Journal of Geology 106.2-3, pp. 149-164.*

International Search Report dated May 24, 2012, as issued in corresponding International Patent Application No. PCT/CN2012/0000170 filed Feb. 13, 2012.

\* cited by examiner

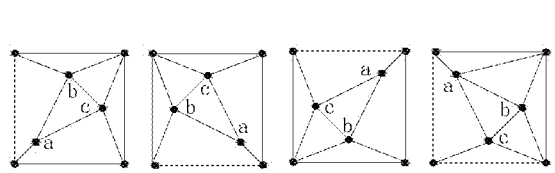
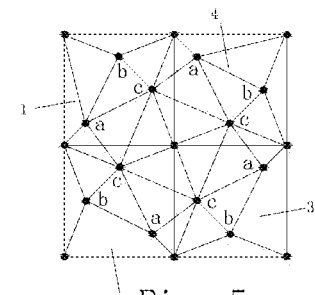
Fig. 1 Fig. 2 Fig. 3 Fig. 4 Fig. 5
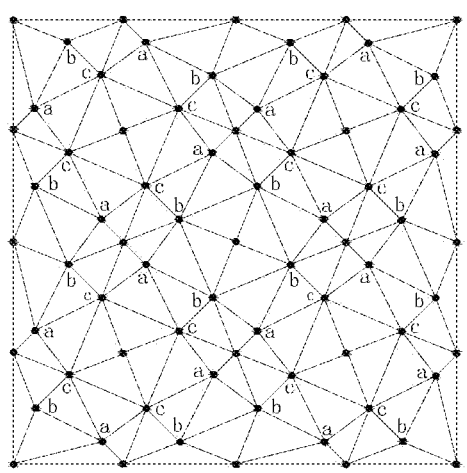
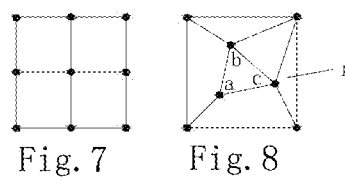
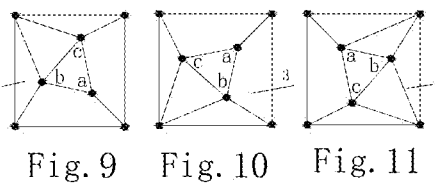
Fig. 6 Fig. 7 Fig. 8 Fig. 9 Fig. 10 Fig. 11
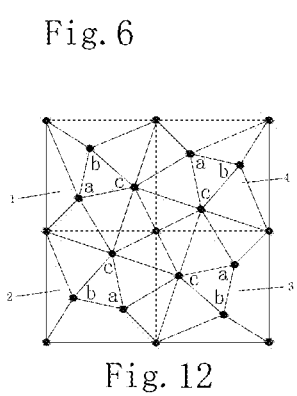
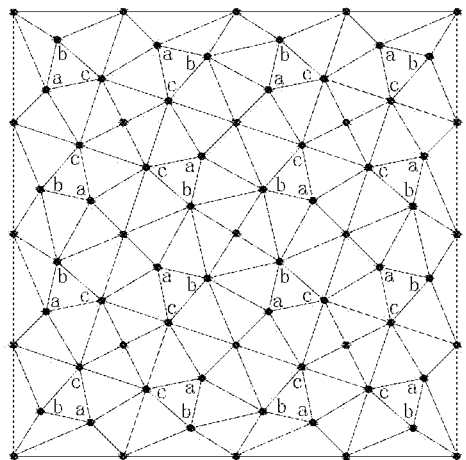
Fig. 12 Fig. 13

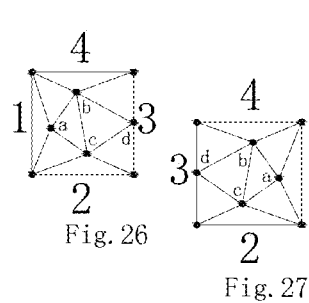
Fig. 26
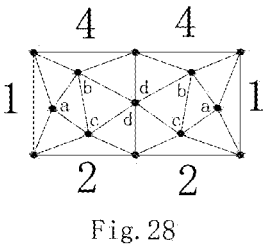
Fig. 27
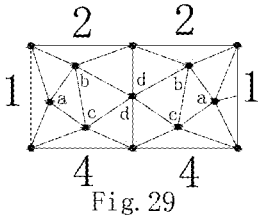
Fig. 28
Fig. 29
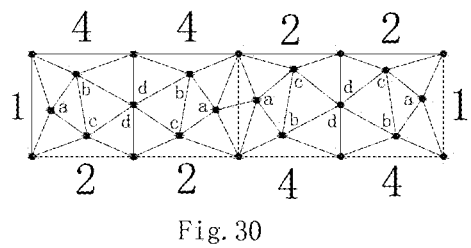
Fig. 30
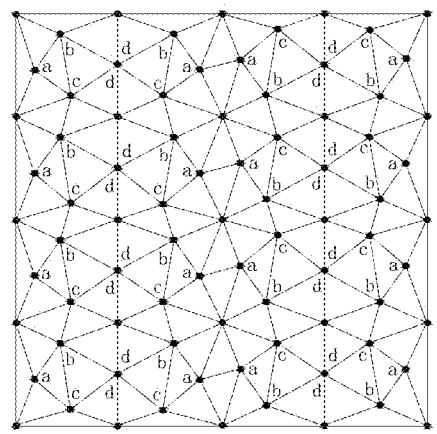
Fig. 31
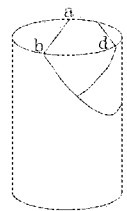
Fig. 32-a
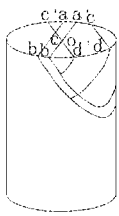
Fig. 32-b
Fig. 32-c
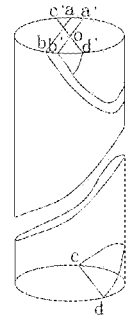
Fig. 32-d

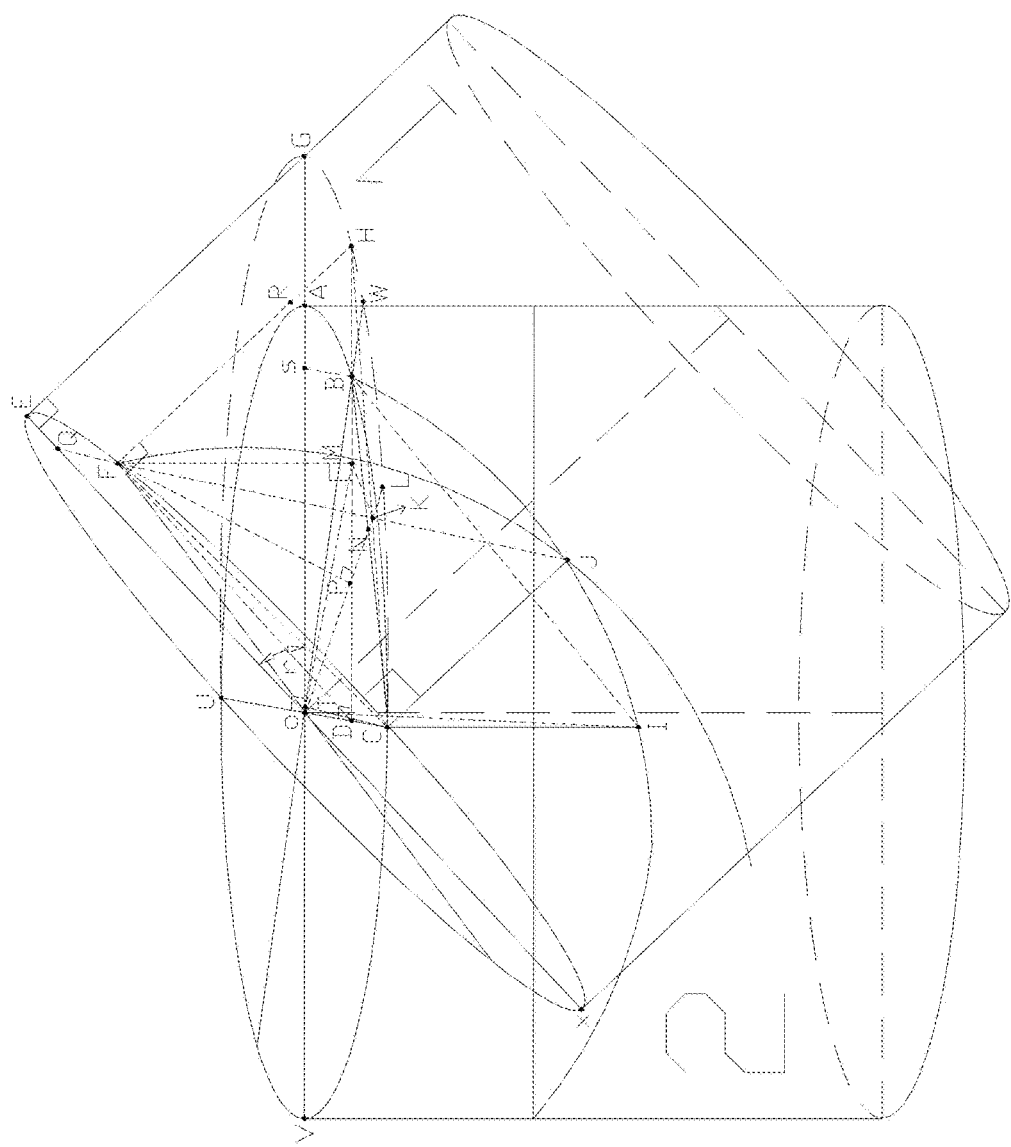
Fig. 34-a

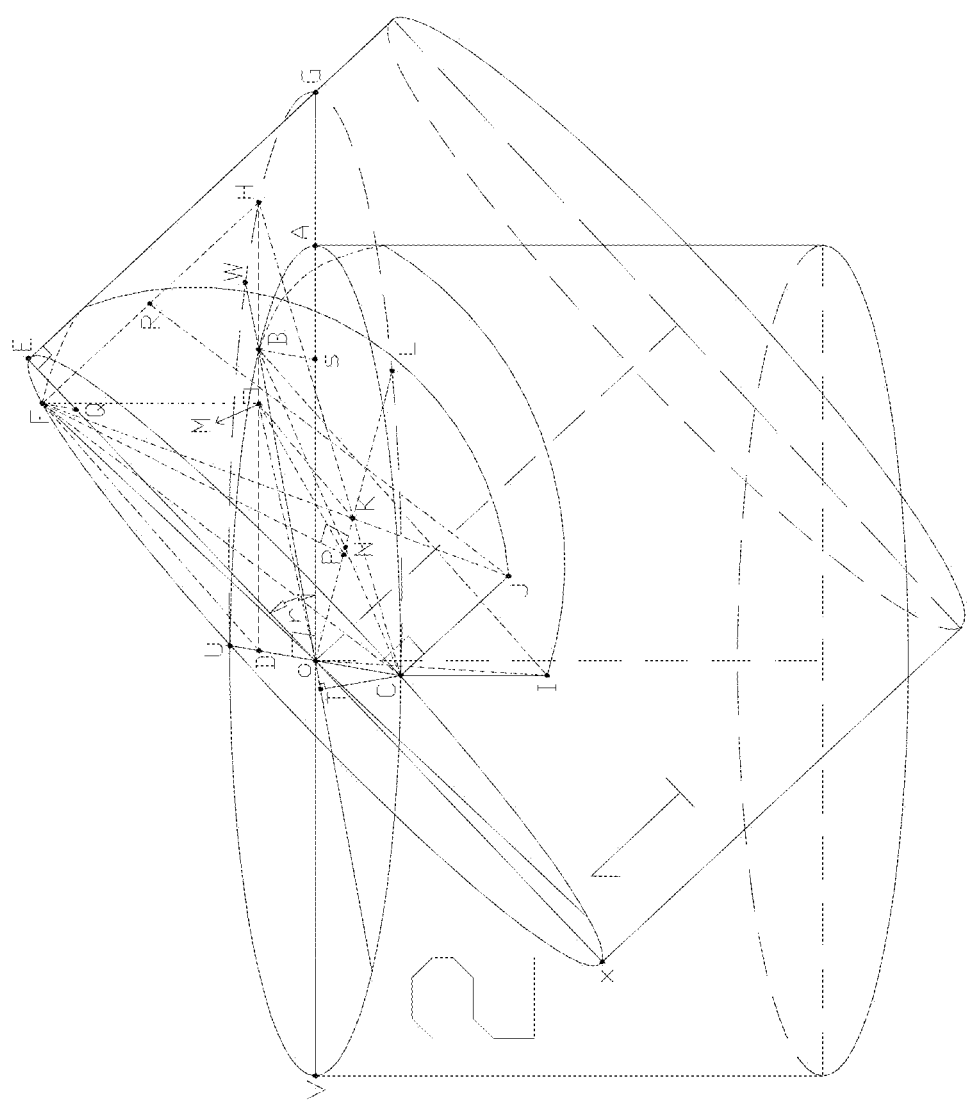
Fig. 34-b

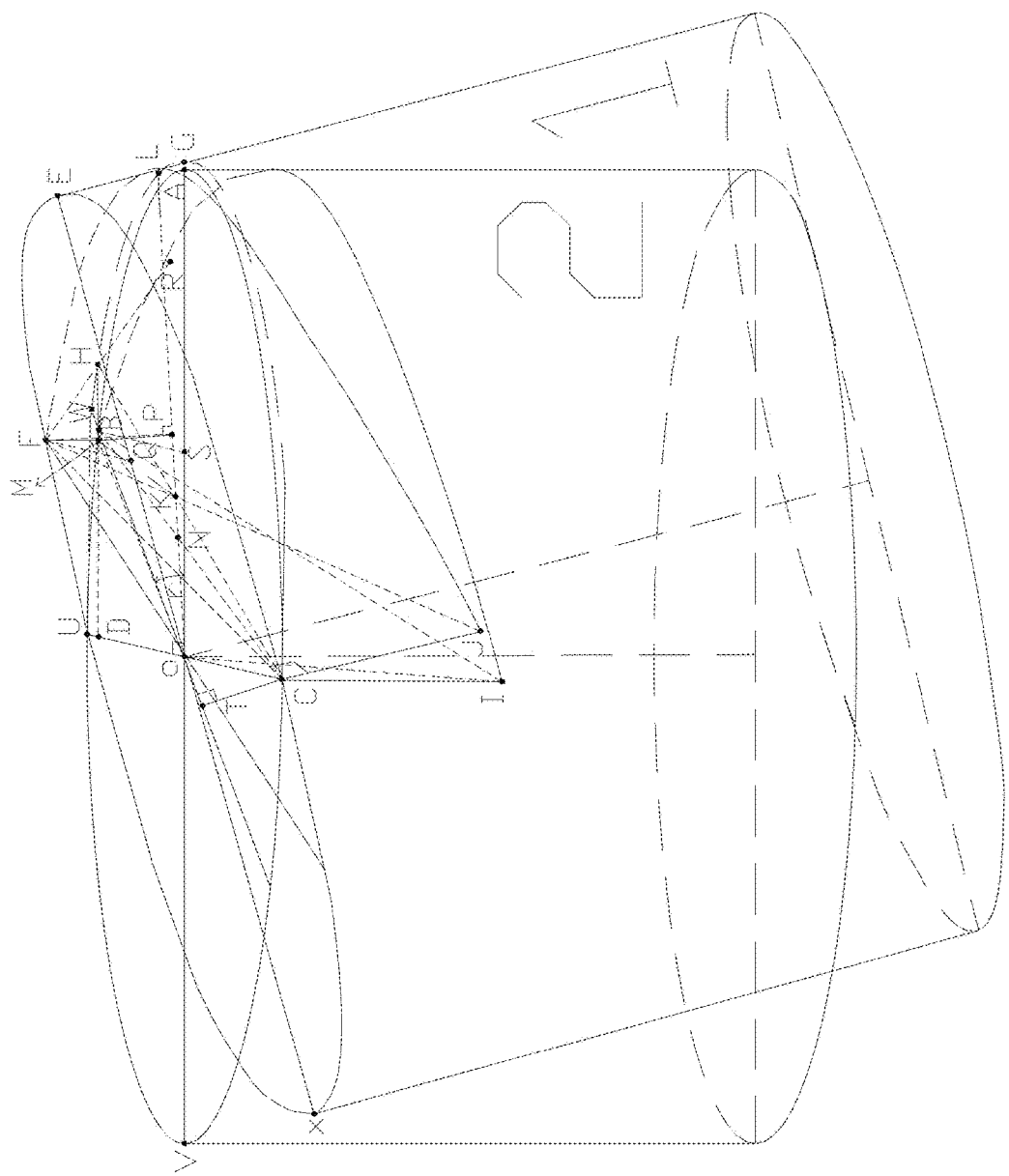
Fig. 34-c

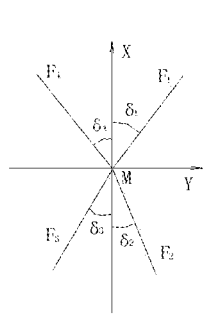
Fig. 36
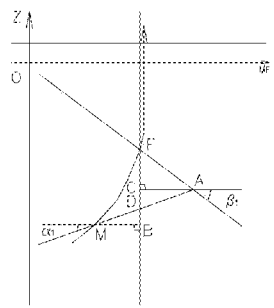
Fig. 37-a
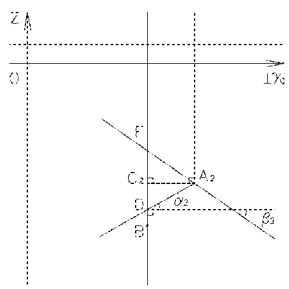
Fig. 37-b
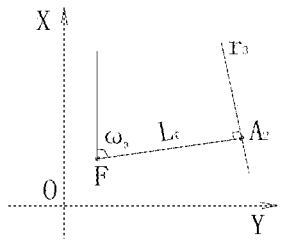
Fig. 37-c
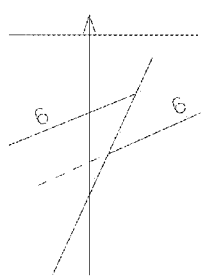
Fig. 38

GEOLOGICAL EXPLORATION METHOD FOR MAKING PLAN AND ELEVATION DRAWINGS DIRECTLY BY ROTATIONAL TIN NETWORK AND NON PROFILING METHOD

BACKGROUND OF THE INVENTION

1. Field of the Invention

The invention relates generally to a set of geological exploration methods in geological exploration field, which is suitable for directly constructing high-precision geological exploration three-dimensional models, plans and sections.

2. Description of the Prior Art

The existing geological exploration methods, of using the square/rectangle/triangle/hexagon/radial networks, the correction methods for curved drill holes, the adjusting methods for the positions of drill holes according to the three adjacent drill holes which met the same fault, and the map-making methods of mapping plans after mapping sections, face a number of challenges, listed as follows:

1) The existing methods often suffer from the difficulty in controlling structures, minelayers/stratum/ore bodies, and more exploratory wells and drill holes, due to the unreasonable layout of drill holes.
2) It is impossible to determine the fault occurrence, according to the data of one or two drilled holes that met the same fault; therefore, in the situation, we are unable to effectively adjust the position of drill holes that have not drilled, in order to track and control faults.
3) Mapping section views need to correct the bending of drillings ahead, namely, make the points of structures, and minelayers/stratum/ore bodies of oblique holes projected onto vertical sections; these two processes lead to errors. Plans can only be produced based on projecting the points of sections onto the plans, it results the following errors.
4) Because the large spacing between adjacent sections of plan, and the connections of the contours and broken ore/rock intersecting lines were made by using non-vector method, the accuracies of geological maps are not better.
5) It is not conducive to timely and accurately construct high-precision three-dimensional model, plans and sections for geological exploration.
6) The existing methods fail to precisely construct high-precision three-dimensional model, plans and sections for geological exploration.

SUMMARY OF THE INVENTION

Briefly, the present invention relates generally to a set of geological exploration methods, of using the non-section methods and the rotary-matching networks formed by triangulated irregular (in the following, "rotary networks" stands for rotary-matching networks formed by triangulated irregulars). It aims to directly construct high-precision three-dimensional model, plans and sections. It presents a robust and efficient process for solving the drawbacks of the existing geological exploration method, such as the dispersion of exploring wells or drill holes, the faults tracking, the controlling of structures, minelayers/structures/ore bodies, the bending correction of drillings, and the geological map-making methods. It comprises the following methods and steps:

1. Firstly, the side length of basis square is determined based on analysis method/encryption method/mathematical statistic method/dilution method, or using two times the side length of square exploration network, referring to FIGS. 1 and 7.

2. Shown in FIG. 1, (1) four sampling points are respectively arranged at four vertexes of basic square; (2) three sampling points are dispersed within basic square; (3) join the above three sampling points a, b and c by triangle; (4) select a vertex from the four vertexes of the basic square; the sum of distances from the selected vertex point to two adjacent sampling points of triangle vertexes inside the square shall be minimum, then, join the three sampling points by triangle; (5) respectively make the joint lines from other three vertexes of basic square to a nearest sampling points of triangles vertexes inside the square. Then, the basic unit 1 is formed.

3. Rotary unit 1 is generated by counterclockwise rotating basic unit 1 for 90 degrees from its original position, shown in FIG. 2; rotary unit 2 is generated by counterclockwise rotating basic unit 1 for 180 degrees from its original position, shown in FIG. 3; and rotary unit 3 is generated by counterclockwise rotating basic unit 1 for 270 degrees from its original position, shown in FIG. 4.

4. Referring to FIG. 5, the rotary unit 1 is joined to the base of basic unit 1, the rotary unit 3 is joined to the right side of basic unit 1, and the rotary unit 2 is joined to the right side of rotary unit 1 and the base of rotary unit 3; at the same time, make the sampling points at the vertexes of two adjacent units coincided. Then, join the sampling points of triangle vertexes, which are on both sides of common edge of adjacent two units, and make the minimum angle larger among the 6 interior angles in two adjacent triangles, the length of the joint lines 0.20~0.85 times of basic square side length, and make the distribution of sampling points more stagger and dispersed. Later, remove the lines between two adjacent vertexes of square. In this way, a square matching unit is connected.

5. Shown in FIG. 6, using matching unit as reproducing unit, translate and replicate matching unit in exploration area; at the same time, make the sampling points at the vertexes of two adjacent matching units coincided. Then, join the sampling points, which are on both sides of common edge of two adjacent matching units, and make the minimum angle larger among the 6 interior angles in two adjacent triangles, the length of the joint lines 0.20~0.85 times of basic square side length, the distribution of sampling points more stagger and dispersed. Finally, remove the lines between two adjacent vertexes of squares, to form initial rotary network. The network can be also suitable for horizontal exploration. Respectively choosing one unit from 4 units in the matching unit as starting unit of initial rotary network, 4 subsets programs of initial rotary network can be obtained. Then, a scheme is selected from the 4 subsets schemes according to the specific situation.

6. Exploratory wells or drill holes are arranged at the sampling points of initial exploration networks 7. Determination of the strike and dip direction of minelayer/stratum, and fault occurrence based on the logging and non-oriented cores from one drill hole that met fault, and the loggings from adjacent drill holes 7.1 Determination of the strike and dip direction of marker layer which are contacted or virtually contacted with the bottom/top surface of fault, and fault occurrence 7.1.1 Determination of the strike and dip direction of marker layer, which are contacted or virtually contacted with the bottom/top surface of fault 7.1.1.1 When the attitude of mine layer/stratum, which is contacted with the bottom/top surface of fault, is visible in core, if the strike of fault and/or marker layer on the horizontal top surface of oblique drill core is not through the center of core, shown in FIG. 32-*a*, we take the drill core upright, and take the marker layer and/or fault to the virtual position which is through the center of core and keeping its attitude, shown in FIG. 32-*b*.

7.1.1.2 When the attitude of mine layer/stratum, which is contacted with the bottom/top surface of fault, is invisible in core, shown in FIG. 32-*c*. Take the drill core upright, and take the minelayer/stratum/ore body near the fault in the core pieces, or in the adjacent core pieces which can be well put together with the core piece where the fault exists, to the virtual position passing through the center of core and keeping its attitude, shown in FIG. 32-*d*.

7.1.2 Firstly, plot a local structure contour map for bottom surface of marker layer in the range, adjacent to the drill hole which met fault, according to the bottom elevations of this marker layer in this drill hole and adjacent drill holes, on one side of roughly strike of marker layer; then, plot another local structure contour map on another side; at last, choose the rational group of two groups dip angles, roughly strikes and roughly dip directions in two maps, as dip angle $\alpha_{mo}$, roughly strike $OL_o$ and roughly dip direction of marker layer.

In the following, "v" stands for azimuth and "r" stands for inclination of the drill core at the depth where the measurements were taken.

7.1.3 Based on the range of v, the roughly dip direction of marker layer, the relative positions of v, $OL_o$ and $\omega'$, $\omega'$ stands for the strike of marker layer on upright core, shown in FIG. 33, the formulas group selected for determining the strike and dip direction of marker layer, and fault attitude, can be classified to the A, B and C three sets of formulas groups.

7.1.3.1 If the following conditions are satisfied, including (1) v is greater than or equal to 0° and less than 180°, (2) v is less than or equal to $OL_o$, and the difference between $OL_o$ and v is less than or equal to 90°, (3) when set the direction of v as OA, the roughly dip direction of marker layer is relatively C. Then, this situation includes two cases of 33-*a*1 or 33-*a*2, shown in FIG. 33-*a*1 and 33-*a*2. It belongs to 33-*a*1 when v is less than $\omega'$, and the difference between $\omega'$ and v is less than 90°; when v is greater than $\omega'$, and the difference between v and $\omega'$ is less than 90°, it belongs to 33-*a*2. But, it is unknown to choose which one of 33-*a*1/33-*a*2, because the relative positions of v and the strike of marker layer on upright drill core can not be known. Therefore, need to respectively determine by using A and B sets of formulas groups, shown in FIG. 34-*a* and 34-*b*. Results of two formulas groups of set A and set B can be checked by formulas (30) and (31), and the validated results will be adopted; at the same time, determine this case belongs to 33-*a*1 or 33-*a*2. The strike of marker layer on oblique drill core is equal to v plus $\angle AOK_m$. $\angle AOK_m$ is the angle between v and the strike line of marker layer on oblique core, and the dip direction of marker layer on oblique drill core is equal to the strike of marker layer on oblique drill core plus 90°.

7.1.3.2 If the following conditions are satisfied, including (1) v is greater than or equal to 0° and less than 180°, (2) $OL_o$ is less than v, and the difference between v and $OL_o$ is less than 90°, (3) when set the direction of v as OA, the roughly dip direction of marker layer is relatively C, shown in FIG. 33-*b*. Then, this situation need select C set of formulas group for calculating, shown in FIG. 34-*c*. The strike of marker layer on oblique drill core is equal to v minus $\angle AOK_m$, and the dip direction of marker layer on oblique drill core is equal to the strike of marker layer on oblique drill core plus 90°.

7.1.3.3 If the following conditions are satisfied, including (1) v is greater than or equal to 0° and less than 180°, (2) v is less than or equal to $OL_o$, and the difference between the $OL_o$ and v is less than or equal to 90°, (3) when set the direction of v as OA, the roughly dip direction of marker layer is relatively U, shown in FIG. 33-*c*. Then, this situation need select C set of formulas group for calculating, shown in FIG. 34-*c*. The strike of marker layer on oblique drill core is equal to v plus $\angle AOK_m$, and the dip direction of marker layer on oblique drill core is equal to the strike of marker layer on oblique drill core minus 90°.

7.1.3.4 If the following conditions are satisfied, including (1) v is greater than or equal to 0° and less than 180°, (2) $OL_o$ is less than v, and the difference between v and $OL_o$ is less than 90°, (3) when set the direction of v as OA, the roughly dip direction of marker layer is relatively U, shown in FIG. 33-*d*1 and *d*2. Then, this situation can be includes into two cases of 33-*d*1 or 33-*d*2. It belongs to 33-*d*1 when v is greater than $\omega'$, and the difference between v and $\omega'$ is less than 90°, and when v is less than $\omega'$, and the difference between $\omega'$ and v is less than 90°, it belongs to 33-*d*2. But, it is unknown to choose which one of 33-*d*1/33-*d*2, because the relative positions of v and the strike of marker layer on upright drill core can not be known. The tape of this situation is the same with 33-*a*, therefore, need to respectively determine by using A and B sets of formulas groups, shown in FIGS. 34-*a* and 34-*b*. The results of two formulas groups of set A and set B can be checked by formulas (30) and (31), and the validated results will be adopted, at the same time, determine this case belongs to 33-*d*1 or 33-*d*2. The strike of marker layer on oblique drill core is equal to v minus $\angle AOK_m$, and the dip direction of marker layer on oblique drill core is equal to the strike of marker layer on oblique drill core plus 270°.

7.1.3.5 If the following conditions are satisfied, including (1) v is greater than or equal to 180° and less than 360°, (2) v is less than or equal to $OL_o$, and the difference between the $OL_o$, and v is less than or equal to 90°, (3) when set the direction of v as OZ, the roughly dip direction of marker layer is relatively C, shown in FIG. 33-*e*. Then, the tape of this situation is the same with 33-*b*, therefore, this situation need select C set of formulas group for calculating, shown in FIG. 34-*c*. The strike of marker layer on oblique drill core is equal to v plus $\angle AOKm$, and the dip direction of marker layer on oblique drill core is equal to the strike of marker layer on oblique drill core minus 90°.

7.1.3.6 If the following conditions are satisfied, including (1) v is greater than or equal to 180° and less than 360°, (2) $OL_o$ is less than v, and the difference between v and $OL_o$ is less than 90°, (3) when set the direction of the azimuth of drill core as OZ, the roughly dip direction of marker layer is relatively C, shown in FIGS. 33-*f*1 and *f*2. Then, this situation can be includes into two cases of 33-*f*1 or 33-*f*2. It belongs to 33-*f*1 when v is greater than $\omega'$, and the difference between v and $\omega'$ is less than 90°, and when v is less than $\omega'$, and the difference between $\omega'$ and v is less than 90°, it belongs to 33-*f*2. But, it is unknown to choose which one of 33-*f*1/33-*f*2, because the relative positions of v and the strike of marker layer on upright drill core can not be known. The tape of this situation is the same with 33-*a*, therefore, need to respectively determine by using A and B sets of formulas groups, shown in FIGS. 34-*a* and 34-*b*. The results of two formulas groups of set A and set B can be checked by formulas (30) and (31), and the validated results will be adopted, at the same time, determine this case belongs to 33-f1 or 33-f2. The strike of marker layer on oblique drill core is equal to v minus $\angle AOK_m$, and the dip direction of marker layer on oblique drill core is equal to the strike of marker layer on oblique drill core minus 90°.

7.1.3.7 If the following conditions are satisfied, including (1) v is greater than or equal to 180° and less than 360°, (2) v is less or equal to than $OL_o$, and the difference between the roughly strike of marker layer and the azimuth of drill core is less than or equal to 90°, (3) when set the direction of the azimuth of drill core as OZ, the roughly dip direction of marker layer is relatively U, shown in FIGS. 33-g1 and g2, then, this situation can be includes into two cases of 33-g1 or 33-g2. It belongs to 33-g1 when v is less than ω', and the difference between ω' and v is less than 90°, and when v is greater than ω', and the difference between v and ω' is less than 90°, it belongs to 33-g2. But, it is unknown to choose which one of 33-g1/33-g2, because the relative positions of v and the strike of marker layer on upright drill core can not be known. The tape of this situation is the same with 33-a, therefore, need to respectively determine by using A and B sets of formulas groups, shown in FIGS. 34-a and 34-b. The results of two formulas groups of set A and set B can be checked by formulas (30) and (31), and the validated results will be adopted, at the same time, determine this case belongs to 33-g1 or 33-g2. The strike of marker layer on oblique drill core is equal to the azimuth of drill core plus $\angle AOK_m$, and the dip direction of marker layer on oblique drill core is equal to the strike of marker layer on oblique drill core minus 270°.

7.1.3.8 If the following conditions are satisfied, including (1) v is greater than or equal to 180° and less than 360°, (2) $OL_o$ is less than v, and the difference between v and the roughly strike of marker layer is less than 90°, (3) when set the direction of the azimuth of drill core as OZ, the roughly dip direction of marker layer is relatively U, shown in FIG. 33-h. Then, the tape of this situation is the same with 33-b, it need select C set of formulas group for calculation, shown in FIG. 34-c. The strike of marker layer on oblique drill core is equal to v minus $\angle AOK_m$, and the dip direction of marker layer on oblique drill core is equal to the strike of marker layer on oblique drill core plus 90°.

7.1.4 Determinations of angle $\angle AOB_m$, between v and the strike of marker layer that is contacted or virtually contacted with the bottom/top surface of fault on upright drill core 2, and angle $\angle AOK_m$ between v and the strike of marker layer that is contacted or virtually contacted with the bottom/top surface of fault on the oblique drill core 1

All formulas of A, B and C sets of formulas groups are:

$$\sin FOM = \sin r \cdot \cos AOB_m \tag{1}$$

$$FH = OF \cdot \cos AOB_m \cdot \tan r \tag{2}$$

$$BC^2 = 2R^2 \cdot (1-\cos(90-\angle AOB_m)) \tag{3}$$

$$\tan FHK = BC/FH \tag{4}$$

$$\tan DBC = (1-\sin AOB_m)/\cos AOB_m \tag{5}$$

$$\tan CBI = \tan \alpha'_m \cdot \cos(90-\angle DBC - \angle AOB_m) \tag{6}$$

$$\angle HFK = 90 - \angle CBI \tag{7}$$

$$FK = FH \cdot \sin FHK / \sin(180 - \angle FHK - \angle HFK) \tag{8}$$

$$\tan COI = \tan \alpha'_m \cdot \cos AOB_m \tag{9}$$

$$\sin BOI = \sin COI / \sin \alpha'_m \tag{10}$$

$$CI = BC \cdot \tan CBI \tag{11}$$

$$OI^2 = R^2 + CI^2 \tag{12}$$

$$BI^2 = BC^2 + CI^2 \tag{13}$$

$$\sin OBI = OI \cdot \sin BOI / BI \tag{14}$$

$$\angle OFK = \angle OBI \tag{15}$$

$$OK^2 = R^2 + FK^2 - 2RFK \cdot \cos OFK \tag{16}$$

$$\sin FOK = FK \cdot \sin OFK / OK \tag{17}$$

$$\sin \alpha_m = \sin FOM / \sin FOK \tag{18}$$

$$\cos PMO = \tan FOM / \tan \alpha_m \tag{19}$$

$$\angle MOK = 90 - \angle PMO \tag{20}$$

$$\sin FKM = R \cdot \sin FOM / FK \tag{21}$$

$$\cos PMK = \tan FKM / \tan \alpha_m \tag{22}$$

$$OM = OF \cdot \cos FOM \tag{23}$$

$$\angle OMK = \angle PMO + \angle PMK \tag{24}$$

$$FM = OF \cdot \sin FOM \tag{25}$$

$$MK^2 = FK^2 - FM^2 \tag{26}$$

$$\sin OKM = OM \cdot \sin OMK / OK \tag{27}$$

$$\cos AOM = \tan FOM / \tan r \tag{28}$$

$$\angle AOK_m = \angle AOM + \angle MOK \tag{29}$$

$$\angle MOK = 180 - \angle OMK - \angle OKM \tag{30}$$

$$\sin MOK = MK \cdot \sin OMK / OK \tag{31}$$

$$BC^2 = 2R^2(1-\cos(90+\angle AOB_m)) \tag{32}$$

$$\tan DBC = (1+\sin \angle AOB_m)/\cos AOB_m \tag{33}$$

$$\tan CBI = \tan \alpha'_m \cdot \cos(90-\angle DBC + \angle AOB_m) \tag{34}$$

$$BOI = 180 - \arcsin(\sin COI / \sin \alpha'_m) \tag{35}$$

$$\angle AOK_m = \angle MOK - \angle AOM \tag{36}$$

$$\angle OMK = \angle PMO - \angle PMK \tag{37}$$

$$\angle AOK_m = \angle AOM - \angle MOK \tag{38}$$

In formula (24) and (37), if $OK^2 \geq OM^2 (1-\sin^2 MOK)$, formula (24) is adopted; otherwise, formula (37) is adopted. In formula (27), if $OM^2 \leq OK^2 + MK^2$, $\angle OKM = \arcsin(OM \cdot \sin OMK/OK)$; otherwise, $\angle OKM = 180 - \arcsin(OM \sin OMK/OK)$.

7.1.4.1 Specific contents and diagram for A set of formulas group

The conditions of A set of formulas group are as follows: (1) v is greater than or equal to 0° and less than 180°, (2) v is less than $OL_o$ and the strike of marker layer on upright drill core; the difference between $OL_o$ and v, and the difference between strike of marker layer on upright drill core and v are both less than 90°, (3) when set the direction of v as OA, the rough dip direction of marker layer is relatively C. The schematic diagrams of A set of formulas group are shown in FIGS. 33-a1 and 34-a.

A1. Solve equations group consisting of formulas (1)~(18) using mathematical software, to determine ∠AOB$_m$ between the azimuth of drilled core and the strike of marker layer which is contacted or virtually contacted with the bottom/top surface of fault on the upright drilled core 2.

Known: r, α'$_m$, α$_{mo}$, let α$_{mo}$=α$_m$, OA=OB=OF=OE=OC=OU=R, R are the radius of drill core A2. Solve equations group consisting of formulas (1)~(29) using mathematical software, to determine angle ∠AOK$_m$ between the azimuth of drilled core and the strike of marker layer which is contacted or virtually contacted with the bottom/top surface of fault on the oblique drilled core 1.

Known: r, α'$_m$, α$_{mo}$, ∠AOB$_m$, OA=OB=OF=OE=OC=OU=R, R are the radius of drill core A3. Verification of the correctness for calculation results of A1 and A2

Verify the results using formula (30) and formula (31) respectively.

If ∠MOK determined from A3 is equal to ∠MOK determined from A2, then, ∠AOB$_m$ determined from A1 and ∠AOK$_m$ determined from A2 are valid; otherwise, ∠AOB$_m$ and ∠AOK$_m$ are invalid.

7.1.4.2 Specific contents and diagram for B set of formulas group

The conditions of B set of formulas group are as follows: (1) v is greater than or equal to 0° and less than 180°, (2) v is less than OL$_o$, but greater than the strike of marker layer on upright drill core; the difference between OL$_o$ and v, and the difference between v and the strike of marker layer on upright drill core are both less than 90°, (3) when set the direction of v as OA, the rough dip direction of marker layer is relatively C. The schematic diagrams of B set of formulas group are shown in FIGS. 33-*a2* and 34-*b*.

B1. Solve equations group consisting of formulas (1)~(18) using mathematical software, to determine ∠AOB$_m$ between the azimuth of drilled core and the strike of marker layer which is contacted or virtually contacted with the bottom/top surface of fault on the upright drilled core 2. The known conditions are the same with A1.

B2 Solve equations group consisting of formulas (1), (2), (32), (4), (33), (34), (7)~(9), (35), (11)~(28), (36) and (37) using mathematical software, to determine ∠AOK$_m$ between the azimuth of drilled core and the strike of marker layer which is contacted or virtually contacted with the bottom surface or top surface of fault on the oblique drilled core 1. The known conditions are the same with A2. The known conditions are the same with A1.

B3 Verification of the correctness for calculation results of B1 and B2

Verify the results using formula (30) and formula (31) respectively.

If ∠MOK determined from B3 is equal to ∠MOK determined from B2. then, ∠AOB$_m$ determined from B1 and ∠AOK$_m$ determined from B2 are valid; otherwise, ∠AOB$_m$ and ∠AOK$_m$ are invalid.

7.1.4.3 Specific contents and diagram for C set of formulas group

The conditions of C set of formulas group are as follows: (1) v is greater than or equal to 0° and less than 180°, (2) v is greater than OL$_o$ and the strike of marker layer on upright drill core; the difference between v and OL$_o$, and the difference between v and the strike of marker layer on upright drill core are both less than 90°, (3) when set the direction of v as OA, the rough dip direction of marker layer is relatively C. The schematic diagrams of C set of formulas group are shown in FIGS. 33-*b* and 34-*c*.

C1. Solve equations group consisting of formulas (1)~(18) using mathematical software, to determine ∠AOB$_m$ between the azimuth of drill core and the strike of marker layer which is contacted or virtually contacted with the bottom surface or top surface of fault on the upright drill core 2. The known conditions are the same with A1.

C2. Solve equations group consisting of formulas (1), (2), (32), (4), (33), (34), (7)~(9), (35), (11)~(28), (37) and (38) using mathematical software, to determine ∠AOK$_m$ between the azimuth of drill core and the strike of marker layer which is contacted or virtually contacted with the bottom surface or top surface of fault on the oblique drill core 1. The known conditions are the same with A2.

C3. Verification of the correctness for calculation results of C1 and C2

Verify the results using formula (30) and formula (31) respectively.

If ∠MOK determined from C3 is equal to ∠MOK determined from C2, then, ∠AOB$_m$ determined from C1 and ∠AOK, determined from C2 are valid; otherwise, ∠AOB$_m$ and ∠AOK$_m$ are invalid.

7.1.5 Determinations of angle ∠AOB$_f$ between v and the strike of fault on the upright drill core 2

Horizontally rotate upright drill core 2 about its axis, let the position of the strike ω' of marker layer on upright drill core equal to the position of line OB known by ∠AOB$_m$ determined from A1/B1/C1, and measure the strike, dip direction and dip angle of fault on upright drill core at this position. Then, we determine ∠AOB$_f$ between v and fault strike on upright drill core 2 according to the relative positions between the strikes of marker layer and fault on the upright drill core 2. If the strike of marker layer is greater than or equal to that of fault on the upright drill core 2, ∠AOB$_f$ is equal to ∠AOB$_m$ minus θ; θ stands for the angle between the strikes of fault and marker layer on the upright drill core 2; otherwise, θ plus ∠AOB$_m$.

7.1.6 Take the marker layer of 7.1.3 as fault, the minelayer/stratum of FIG. 33 as fault, and the minelayer/stratum of FIG. 34 as fault, shown in FIGS. 33 and 34, and a set of formulas group is selected based on the methods of 7.1.3.

7.1.7 Determinations of ∠AOK$_f$ between v and the strike of fault, and α'$_f$, the dip angle of fault in the tilted drill core 1

Known: r, α'$_f$, ∠AOB$_f$, OA=OB=OF=OE=OC=OU=R, R are the radius of core.

In A, B and C sets of formulas group, change α'$_m$ to α'$_f$, α$_m$ to α$_f$, ∠AOB$_m$ to AOB$_f$, and ∠AOK$_m$ to ∠AOK$_f$.

7.1.7.1 If A set of formulas group is selected, by using mathematical software to solve the equations group consisting of formulas (1)~29), and to get ∠AOK$_f$ between v and the strike of fault in the tilted drill core 1, and α$_f$, the true dip angle of fault.

Verify the results using formula (30) and formula (31) respectively.

If ∠MOK determined respectively from (30) and (31) are equal to ∠MOK determined from formula (20), then, α$_f$ determined from formula (18) is true dip angle of fault, and ∠AOK$_f$ determined formula (29) is valid; otherwise, α$_f$ and ∠AOK$_f$ are invalid.

7.1.7.2 If B set of formulas group is selected, by using mathematical software to solve the equations group consisting of formulas (1), (2), (32), (4), (33), (34), (7)~(9), (35), (11)~(23), (37), (25)~(28), and (36), and to get ∠AOK$_f$ and α$_f$.

Verify the results using formula (30) and formula (31) respectively.

If ∠MOK determined respectively from (30) and (31) are equal to ∠MOK determined from formula (20), then $\alpha_f$ determined from formula (18) is true dip angle of fault, ∠AOK$_f$ determined formula (29) is valid; otherwise, $\alpha_f$ and ∠AOK$_f$ are invalid.

7.1.7.3 If C set of formulas group is selected by using mathematical software to solve the equations group consisting of formulas (1), (2), (32), (4), (33), (34), (7)~(9), (35), (11)~(23), (37), (25)~(28), and (38), and to get ∠AOK$_f$ and $\alpha_f$.

Verify the results using formula (30) and formula (31) respectively.

If ∠MOK determined respectively from (30) and (31) are equal to ∠MOK determined from formula (20), then $\alpha_f$ determined from formula (18) is the true dip angle of fault, ∠AOK$_f$ determined formula (29) is valid; otherwise, $\alpha_f$ and ∠AOK$_f$ are invalid.

7.1.8 Determinations of the strike and dip direction of fault in oblique drill core 1

7.1.8 Take the marker layers of 7.1.3 as faults, ∠AOK, of 7.1.3 as ∠AOK$_f$, determine respectively the strike and dip direction of fault in the tilted drill core according to the methods of 7.1.3.

7.2 Determinations of the strike, dip direction and dip angle of minelayers, stratum, the top and/or bottom surfaces of ore bodies Determine dip angle $\alpha$ of minelayers, stratum, the tops and/or bottom surfaces of ore bodies according to the methods of 7.1.1 and 7.1.2, and the strike $\omega_m$ and dip direction $Q_m$ of minelayers, stratum, the top and/or bottom surfaces of ore bodies according to the methods of 7.1.1~7.1.4.

8. Determinations of the distance and direction from the point that met fault in drill hole to the broken ore/rock intersecting lines on exploration works plan based on the occurrences of fault and minelayer/stratum 8.1 Determinations of the azimuth of the broken ore/rock intersecting lines 8.1.1 Determinations of the clamp angle between the strikes of fault and minelayer/stratum Shown in FIG. 35, set $\omega_m$ the strike of minelayer/stratum of original data, $\omega_{m1}$ the one that is less than 180° in two directions of strikes of minelayer/stratum, $\omega_{m2}$ the another one that is greater than 180° in two directions of strikes of minelayer/stratum, $\omega_f$ the strike of fault of original data, $\omega_{f1}$ the one that is less than 180° in two directions of strikes of fault, $\omega_{f2}$ the another one that is greater than 180° in two directions of strikes of fault, $\omega_1$ the angle between $\omega_{m1}$ and $\omega_{f1}$, $\omega_2$ the angle between $\omega_{m2}$ and $\omega_{f1}$, or $\omega_{m1}$ and $\omega_{f2}$, $\omega$ the clamp angle between the strike of fault and that of minelayer/stratum, $\alpha$ the dip angle of minelayer/stratum, $\beta$ the dip angle of fault, $Q_m$ the dip direction of minelayer/stratum, $Q_f$ the dip direction of fault. If the dip angle of fault is greater than that of minelayer/stratum, r stands for the angle between fault strike and the projection line of the broken ore/rock intersecting line in plan. If the dip angle of fault is less than that of minelayer/stratum, r is the angle between the strike of minelayer/stratum and the projection line of the broken ore/rock intersecting line in plan, $r_o$ is the azimuth of the projection line of the broken ore/rock intersecting line in plan.

a. If $\omega_m \leq 180$, then, $\omega_{m1} = \omega_m$, $\omega_{m2} = \omega_m + 180$
If $\omega_m > 180$, then, $\omega_{m1} = \omega_m - 180$, ($\omega_{m2} = \omega_m$
b. If $\omega_f < 180$, then, $\omega_{f1} = \omega_f$, $\omega_{f2} = \omega_f + 180$
If $\omega_f > 180$, then, $\omega_{f1} = \omega_f - 180$, $\omega_{f2} = \omega_f$ c. Set $\omega_1 = |\omega_{m1} - \omega_{f1}|$, $\omega_2 = 180 - \omega_1$
d. If $\omega_1 \leq \omega_2$, then, $\omega = \omega_1$
If $\omega_1 > \omega_2$, then, $\omega = \omega_2$ 8.1.2 Determinations of the azimuth of the broken ore/rock intersecting line 8.1.2.1 If the dip directions of fault and minelayer/stream are opposed, namely, $|Q_m - Q_f| \geq 90°$ 8.1.2.1.1 If the dip angle of fault is greater than that of minelayer/stream, namely, $\beta > \alpha$, then, $$r = \arctan\{\sin\omega \times \tan\alpha \div (\tan\beta + \cos\omega \times \tan\alpha)\} \quad (39)$$

If $\omega_1 \leq \omega_2$, $\omega_{m1} > \omega_{f1}$, shown in FIG. 35-*a*, $r_o = \omega_{f1} + r$
If $\omega_1 \leq \omega_2$, $\omega_{m1} < \omega_{f1}$, shown in FIG. 35-*b*, $r_o = \omega_{f1} - r$
If $\omega_1 > \omega_2$, $\omega_{m1} < \omega_{f1}$, shown in FIG. 35-*c*, $r_o = \omega_{f1} + r$
If $\omega_1 > \omega_2$, $\omega_{m1} > \omega_{f1}$, shown in FIG. 35-*d*, $r_o = \omega_{f1} - r$
If $\omega_{m1} = \omega_{f1}$, then, $_o = \omega_{f1}$ 8.1.2.1.2 If the dip angle of minelayer/stream is greater than that of fault, that is, $\alpha > \beta$, then, $$r = \arctan\{\sin\omega \times \tan\beta \div (\tan\alpha + \cos\omega \times \tan\beta)\}$$

If $\omega_1 \leq \omega_2$, $\omega_{m1} > \omega_{f1}$, shown in FIG. 35-*e*, $r_o = \omega_{m1} - r$
If $\omega_1 \leq \omega_2$, $\omega_{f1} > \omega_{m1}$, shown in FIG. 35-*f*, $r_o = \omega_{m1} + r$
If $\omega_1 > \omega_2$, $\omega_{f1} > \omega_{m1}$, shown in FIG. 35-*g*, $r_o = \omega_{m1} - r$
If $\omega_1 > \omega_2$, $\omega_{m1} > \omega_{f1}$, shown in FIG. 35-*h*, $r_o = \omega_{m1} + r$
If $\omega_{m1} = \omega_{f1}$时, then, $\gamma_o = \omega_{f1}$ 8.1.2.2 If the dip directions of fault and minelayer/stream are not opposed, namely, $|Q_m - Q_f| < 90$ 8.1.2.2.1 If the dip angle of fault is greater than that of minelayer/stream, namely, $\beta > \alpha$, then, $$r = \arctan\{\sin\omega \times \tan\alpha \div (\tan\beta - \cos\omega \times \tan\alpha)\}$$

If $\omega_1 \leq \omega_2$, $\omega_{m1} > \omega_{f1}$, shown in FIG. 35-*i*, $r_o = \omega_{f1} - r$
If $\omega_1 \leq \omega_2$, $\omega_{f1} > \omega_{m1}$, shown in FIG. 35-*j*, $r_o = \omega_{f1} + r$
If $\omega_1 > \omega_2$, $\omega_{f1} > \omega_{m1}$, shown in FIG. 35-*k*, $r_o = \omega_{f1} - r$
If $\omega_1 > \omega_2$, $\omega_{m1} > \omega_{f1}$, shown in FIG. 35-1, $r_o = \omega_{f1} + r$
If $\omega_{m1} = \omega_{f1}$, then, $\gamma_o = \omega_{f1}$ 8.1.2.2.2 If the dip angle of minelayer/stream is greater than that of fault, namely, $\alpha > \beta$, then, $$r = \arctan\{\sin\omega \times \tan\beta \div (\tan\alpha + \cos\omega \times \tan\beta)\}$$

If $\omega_1 \leq \omega_2$, $\omega_{m1} > \omega_{f1}$, shown in FIG. 35-*m*, $r_o = \omega_{m1} + r$
If $\omega_1 \leq \omega_2$, $\omega_{f1} > \omega_{m1}$, shown in FIG. 35-*n*, $r_o = \omega_{m1} - r$
If $\omega > \omega_2$, $\omega_{f1} > \omega_{m1}$, shown in FIG. 35-*o*, $r_o = \omega_{m1} + r$
If $\omega_1 > \omega_2$, $\omega_{m1} > \omega_{f1}$, shown in FIG. 35-*p*, $r_o = \omega_{m1} - r$
If $\omega_{m1} = \omega_{f1}$, then, $r_o = \omega_{f1}$ 8.2 Determinations of distance and direction from the point that met fault in drill hole to the broken ore/rock intersecting line on plan 8.2.1 Determinations of the horizontal distance between the point that met minelayer/stratum and the point that met fault in drill hole.

Shown in FIG. 36, set M ($x_m$, $y_m$, $z_m$) the point that met the bottom of minelayer/stratum in drill hole, F ($x_f$, $y_f$, $z_f$) the point that met the bottom of fault in drill hole, $L_{mf}$ the horizontal distance between point M and point F, $$L^2_{mf} = \{(x_f - x_m)^2 + (y_f - y_m)\} \quad (40)$$

8.2.2 Determinations of the pseudo dip angles of fault and minelayer/stratum in the two sections respectively along MF direction and perpendicular to $r_3$.

Shown in FIGS. 36, 37-*a* and 37-*b*, set $\omega_m$ the strike of minelayer/stratum, $Q_m$ the dip direction of minelayer/stratum, $\alpha$ the dip angle of minelayer/stratum, $\omega_f$ the strike of fault, $Q_f$ the dip direction of fault, $\beta$ the dip angle of fault, v the acute angle between the joint line from point M to the point F and the direction north in plan, $\delta$ the azimuth of line FM, $\alpha_1$ the pseudo dip angle of minelayer/stratum in the section along FM direction, $\beta_1$ the pseudo dip angle of fault in the section along MF direction. $r_3$ any direction from point F to the broken ore/rock intersecting line, $\alpha_2$ the pseudo dip angle of minelayer/stratum in the section along FM, $\beta2$ the pseudo dip angle of fault in the section along FM.

$$\tan v=|(y_f-y_m)/(x_f-x_m)| \quad (41)$$

If $y_f > y_m$, $x_f \leq x_m$, then, $\delta=v$
If, $x_f < x_m$, $y_f \geq y_m$, then, $\delta=80°-v$
If, $y_f \leq y_m$, $x_m \geq x_f$, then, $\delta=180+v$
If $x_f > x_m$, $y_m \geq y_f$, then, $\delta=360°-v$ $$\tan \alpha_1 = \tan \alpha |\cos|Q_m-\delta|| \quad (42)$$

$$\tan \beta_1 = \tan \beta |\cos|Q_f-\delta|| \quad (43)$$

$$\tan \alpha_2 = \tan \alpha |\cos|Q_m-r_3|| \quad (44)$$

$$\tan \beta_2 = \tan \beta |\cos||Q_f-r_3|| \quad (45)$$

8.2.3 Determinations of the distance and direction from point F to the broken ore/rock intersecting line along the direction perpendicular to $r_3$ on plan.

8.2.3.1 Determinations of the depth $z'_m$ at which drill hole met bottom of minelayer/stratum in the virtual straight hole passing through point F Shown in FIG. 37-a, the direction of section is from point M to point F, point F and M are the same with the front, set A1 the intersecting point of fault and minelayer/stratum in the section, C the intersecting point of level line passing through point A1 with the vertical line passing through point F, B the intersecting point of the level line passing through point M with the vertical line passing through point F, D the intersecting point of minelayer with the vertical line passing through point F. $z'_m$ the elevation of minelayer/stratum at point D, namely, $z'_m$ is the depth at which drill hole met the bottom of minelayer/stratum in the virtual straight hole passing through point F.

$$z'^2_m=\{(x_f-x_m)^2+(y_f-y_m)^2\}\tan^2\alpha_1 \quad (46)$$

In formula (46), if $z_f$ is greater than $z_m$, and the inclination directions of drill hole and minelayer/stratum are opposed, the minus sign is taken; otherwise, the plus sign. If $z_f$ is less than $z_m$, and the inclination directions of drill hole and minelayer/stratum are opposed, plus sign is taken; otherwise, minus sign.

8.2.3.2 Determinations of the distance from point F to the broken ore/rock intersecting line along the direction perpendicular to $r_3$ on plan Shown in FIG. 37-b, the direction of section is perpendicular to $r_3$ and passing through point F, point C and D are the same with the front. Set Point $A_2$ the intersecting point of fault and mine layer/stratum, $\alpha_2$ the pseudo dip angle of minelayer/stratum along the direction perpendicular to $r_3$, $\beta2$ the pseudo dip angle of fault along the direction perpendicular to $r_3$. Set $L_f$ the horizontal distance from point F to point $A_2$.

$$L_f=|(Z_f-z'_m)/(\tan\beta_2\pm\tan\alpha_2)| \quad (47)$$

In formula (47), if the dip directions of fault and minelayer/stratum are opposed, plus sign is taken; otherwise, minus sign.

If $r_3=r_o$, and the direction of section is at 90° to the broken ore/rock intersecting lines, then, the distance from point F to the broken ore/rock intersecting line is the shortest on plan.

8.2.3.3 The design of direction $r_3$ from point F on plan

Shown in FIG. 37-c, locate point F and the broken ore/rock intersecting lines on plan; then, design the direction from point F to the broken ore/rock intersecting lines. When $r_3=r_o$, set $\omega_3$ the direction from point F to the broken ore/rock intersecting lines.

$$\omega_3=r_o\pm 90° \quad (48)$$

In formula (48), if the broken ore/rock intersecting lines are on one side of fault tendencies, make the absolute value of $\omega_3$ and $Q_f$ less than 90°; otherwise, greater than or equal to 90°.

1) In the following cases, the broken ore/rock intersecting lines is on one side of fault tendencies,
① $Z_f > Z_m$, $Q_f-\delta \geq 90°$, $r_o < Q_m$, $r_o > Q_f$ (or $r_o < Q_f$, $r_o > Q_m$)
② $Z_f > Z_m$, $Q_f-\delta \geq 90°$, $r_o < Q_m$, $r_o < Q_f$ (or $r_o > Q_m$, $r_o > Q_f$), $\beta_2 > \alpha_2$
③ $Z_f > Z_m$, $Q_f-\delta < 90°$, $r_o < Q_m$, $r_o > Q_f$ (or $r_o < Q_f$, $r_o > Q_m$)
④ $Z_f > Z_m$, $Q_f-\delta < 90°$, $r_o < Q_m$, $r_o < Q_f$ (or $r_o > Q_m$, $r_o > Q_f$), ($\beta_2 > \alpha_2$)
⑤ $Z_m > Z_f$, $Q_f-\delta \geq 90°$, $r_o < Q_m$, $r_o < Q_f$ (or $r_o > Q_m$, $r_o > Q_f$), $\alpha_2 > \beta_2$
⑥ $Z_m > Z_f$, $Q_f-\delta < 90°$, $r_o < Q_m$, $r_o < Q_f$ (or $r_o > Q_m$, $r_o > Q_f$), $\alpha_2 > \beta_2$ 2) In the following cases, the broken ore/rock intersecting lines are on another side of fault tendencies,
① $Z_f > Z_m$, $Q_f-\delta \geq 90°$, $r_o < Q_f$, $r_o < Q_f$ (or $r_o > Q_m$, $r_o > Q_f$), $\alpha_2 > \beta_2$
② $Z_f > Z_m$, $Q_f-\delta < 90°$, $r_o < Q_m$, $r_o < Q_f$ (or $r_o > Q_m$, $r_o > Q_f$), $\alpha_2 > \beta_2$
③ $Z_m > Z_f$, $Q_f-\delta \geq 90°$, $r_o < Q_m$, $r_o > Q_f$ (or $r_o < Q_f$, $r_o > Q_m$)
④ $Z_m > Z_f$, $Q_f-\delta \geq 90°$, $r_o < Q_m$, $r_o < Q_f$ (or $r_o > Q_m$, $r_o > Q_f$), $\beta_2 > \alpha_2$
⑤ $Z_m > Z_f$, $Q_f-\delta < 90°$, $r_o < Q_m$, $r_o > Q_f$ (or $r_o < Q_f$, $r_o > Q_m$)
⑥ $Z_m > Z_f$, $Q_f-\delta < 90°$, $r_o < Q_m$, $r_o < Q_f$ (or $r_o > Q_m$, $r_o > Q_f$), $\delta_2 > \alpha_2$ 8.2.3.4 Determinations of the elevation $Z_{mf}$ of the pedal point that is from point F to the broken ore/rock intersecting line on plan
Shown in FIG. 37-b, $$Z_{mf}=Z_f \pm L_f \tan\beta_2 \quad (49)$$

In formula (49), if the broken ore/rock intersecting lines are on one side of the fault tendencies, minus sign is taken; otherwise, plus sign.

8.2.3.5 According to the data of cores and loggings of the drill hole and adjacent drill holes, fault throw can be determined. Then, determine the elevation of the virtual joint point of the extended line of the minelayer/stratum, which did not appear in the drill hole because of the cutting of fault, and the axis of the virtual straight hole passing through point F; the virtual joint point is also marked as $z'_m$. $L_f$ and $\omega_3$ can be respectively determined by using formulas (47) and (48), shown in FIG. 38. $Z_{mf}$ should be calculated based on the specific situation of another fault block.

8.2.3.6 If the changes of dip angles of the same minelayers/stratum in two fault blocks are larger, the $r_o$ in two fault blocks needs to be solved respectively.

8.3 On the exploration works plan, measure length $L_f$ from point F and along $\omega_3$ direction to get a point, mark elevation $z_{mf}$ of the point as basis for joining structure contours; then, draw a short straight line, passing through this point and along direction $r_o$, it is the azimuth line of the broken ore/rock intersecting line at this point.

8.4 According to the broken ore/rock intersecting lines to trace fault, adjust the locations of drill holes which have not drilled and if drilling, will not be drilled to the location where drill hole can control faults and main minelayers/stratum. Make the adjusting radius 0.15 times of basic square side length, and the all joint lines 0.15~0.88 times of basic square side length. All the joint lines related with the adjusted drill holes have changed by adjusting drill holes positions, to form a dynamic exploration network. If a joint line is greater than 0.15~0.88 times of basic square side length, maintain the original drilling position unchanged, consider increasing one drill hole based on the need of fault controlling, shown in FIG. 39.

9. Construct the three-dimensional visualized simple models of geological exploration area according to the data from cores and loggings, and the occurrences of faults, minelayers, stratum and ore bodies determined from 7. In the models, compare and uniformly number faults, minelayers, stratum, or ore bodies, determine the relationships of cuttings and pinches between faults. Based on this basis, make three-dimensional high-precision geological exploration models; then, cut any sections based on the high-precision models.

10. Based on the correct relationships of cuttings and pinches between faults, and the directions of the broken ore/rock intersecting lines at intersecting points, we can better join the broken ore/rock intersecting lines by taking the directions of the broken ore/rock intersecting line as tangential directions. Then, on the sides of triangles of exploration network within the same fault block, use interpolation method to obtain the elevations and strikes of interpolated points, smoothly join adjacent points of equal height by taking the strikes as tangential directions, and join adjacent outcrop points, to form the structure contour map for bottom/top surface of minelayer/stratum/ore body.

11. Produce the sections along the directions of strike, dip direction and any other directions according to the contour maps for bottom/top surface of minelayer/stratum/ore body.

12. According to a whole set of contour maps for bottom surface of minelayers/stratum and sections, the high-precision three-dimensional models, plans and sections of geological exploration area, can be produced; then, complete other geological exploration works.

Advantages of the Invention

1. Comparing with usual square network, the invention not only saves exploratory wells or drill holes, but also reduces controlling spacings between neighboring exploratory wells or drill holes in the strike, dip direction and incline directions of minelayers/stratum/ore bodies. Moreover, improve the dispersion degrees of drill holes and exploratory wells in the directions of strike, dip direction and incline directions, form a good controlling and defense system for faults, and enhance the controlling accuracy of minelayers/stratum/ore bodies.
  (1) In the basic unit, comparing with the square network, there are 4 (1+4×0.25+4×0.5) zones controlled by the sampling points of the square network, and there are also 4 (3+4×0.25) zones controlled by rotary network of example 2. But, rotary network can save three drill holes. In whole exploration area, the ratio of solving drill holes of rotary network is, $$m-[(n/2+1/2)\times(m/2n+1/2)+3(n/2-1/2)\times(m/2n-1/2)]$$

where m is the total number of sampling points in the square network, n is the row number of exploratory wells or drill holes in the square network, m and n are odd numbers, m≥3 and n≥3.
  (2) It conforms to the principle of Delaunay.
  (3) In matching unit, the directions of two adjacent sample points increase to 5.5 ((4+7+5+7+6+4+6)/7) from the 4 of the square network, make the degrees of multiple directional association and correction increase by 37.5% compared to square network.
  (4) In matching unit, set the spacing of gird of square is 20 meters, the average length of two adjacent sample points, along the directions of two sides and diagonals of square networks is 12.07 ((10×4+14.148×4)/8). Because of the optimized consideration for multiple directional controlling distances and their mutual echo, the rotary network can make the lengths of two adjacent sample points at respectively 9.13, 10.51, 10.12, 9.15, 13.21, 12.4, 12.9, 12.54, 11.55, 12.52, 8.88, 12.52, 11.55, 8.31, 13.21 and 12.4, in which 8 distances are less than the average length 12.07, 6 distances are slightly larger than 12.07, and the remaining 2 distances increase by 0.09 compared to 12.07. The average length is 11.31, which increases by 6% compared to the square network.

In base unit, the side lengths along two diagonals, respectively are 8.85, 5.55, 5.47, 8.44, 11.02, 0.69, 7.75 and 8.47, reduce to 7.03 from 14.14 of square network, that is, 0.39 to 0.78 times of square networks. In matching unit, the controlling distances along two vertical directions reduce to 2~5 from 10 of square network, that is, 0.5 to 0.8 times of square network. The advantages are particularly advantageous for controlling characteristic lines. There are 14 types of triangles in the rotary network; their ratios of sides and angles respectively are around five main golden section points 0.382, 0.5, 0.618, 0.809, and 1.382, and the mean value of true errors is 0.04.
  (5) From a wide range, form the oval complex network interspersed and staggered along two diagonal directions; it can control linear and planar changes well along multiple directions, and the zones respectively surrounded by the longer sides and shorter sides, are adjacent or surrounded. Because the trends of changes are gradual, the detailed changed laws of the zone surrounded by the shorter sides can be used to distinguish that of the longer sides and improve accuracy of overall analysis.

2. The strikes and dip directions of minelayers/stratum, and fault occurrence can be determined based on the data from logging and non-oriented cores of a drill hole that met fault, and the data from loggings from adjacent drill holes. The distances and directions from points that met fault in hole to the broken ore/rock intersecting line, can be determined based on the occurrences of fault and minelayer/stratum; then, the locations and directions of the broken ore/rock intersecting line can be directly drawn on the contour maps for bottom surface of minelayer/stratum; taking the broken ore/rock intersecting lines as tangent directions, the subsequent drill hole can be adjusted to the location where drill hole can control faults and main minelayers/stratum.

3. Directly make accurate contour maps for bottom/top surface of minelayers/stratum/ore bodies by the methods of non-sections, which does not need to correct bent drill holes and to make sections ahead of time. In this way, avoid errors and nitty-gritty methods in projecting the points of faults, minelayers and stratum from oblique holes onto sections during sections making.

4. Make the geological analysis between adjacent drill holes and sections easy on plan, respectively take the directions of minelayer strike and the broken ore intersecting lines as tangent directions, join contours and the broken ore intersecting lines between adjacent drill holes or sections by vector, improve the accuracy of contour maps for the bottom/top surface of minelayer/stratum/ore body again.

5. Greatly improve the qualities and precisions of exploration area sections drawn according to the above contour maps for bottom/top surface of minelayer/stratum/ore body, compared with those made according to the existing exploration methods.

6. Make the geological map-making methods more scientific and reasonable.

7. It succeeds in precisely constructing three-dimensional high-precision models, plans and sections for geological exploration. The formula for calculating the improved accuracy is:

$$K=(K_1+K_2)\times(s_{ms}+s_{md}+s_{fm}+s_{fd})/4 \qquad (39)$$

In formula (39), $K_1$=(the spacing of grid of square network−the mean spacing of rotary network along two vertical side directions/the spacing of grid of square network)+|the diagonal line length of grid of square network−the mean of side lengths of rotary network|/the diagonal line length of grid of square network, $K_2$=(the total of drill holes which met faults using rotary network−the total of drill holes which met faults using square network/the total of drill holes which met faults using square network)

$s_{ms}$=the change ratio of minelayers/ore bodies along strike $s_{ms}$=the change ratio of minelayers/ore bodies along dip direction $s_{ms}$=the change ratio of structures along strike $s_{ms}$=the change ratio of structures along dip direction 8. Because these above aspects are interlocking and closely integrated, the overall level of geological exploration methods can be strengthened to a new height, and the quality, precision, effectiveness and efficiency of geological exploration can be significantly enhanced.

BRIEF DESCRIPTION OF THE DRAWINGS

FIG. 1 is the schematic diagram of the basic unit 1 in example 1.

FIG. 2 is the schematic diagram of rotary unit 1 in example 1.

FIG. 3 is the schematic diagram of rotary unit 2 in example 1.

FIG. 4 is the schematic diagram of rotary unit 3 in example 1.

FIG. 5 is the schematic diagram of matching unit in example 1.

FIG. 6 is the schematic diagram of initial exploration network made by translating and replicating the matching unit of FIG. 5.

FIG. 7 is the schematic diagram of square network in contrast with rotary network.

FIG. 8 is the schematic diagram of the basic unit 1 in example 2.

FIG. 9 is the schematic diagram of rotary unit 1 in example 2.

FIG. 10 is the schematic diagram of rotary unit 2 in example 2.

FIG. 11 is the schematic diagram of rotary unit 3 in example 2.

FIG. 12 is the schematic diagram of matching unit in example 2.

FIG. 13 is the schematic diagram of initial exploration network made by translating and replicating the matching unit of FIG. 12.

FIG. 26 is the schematic diagram of the basic unit 1 in example 4.

FIG. 27 is the schematic diagram of rotary unit 1 in example 4.

FIG. 28 is the schematic diagram of rotary unit 2 in example 4.

FIG. 29 is the schematic diagram of rotary unit 3 in example 4.

FIG. 30 is the schematic diagram of matching unit in example 4.

FIG. 31 is the schematic diagram of initial exploration networks made by translating and replicating the matching unit of FIG. 30.

FIG. 32 is the schematic diagram of position relationships between fault and minelayer/stratum on upright core, ab stands for original position of fault strike on the upright core, cd stands for original position of strike of minelayer/stratum on the upright core, a'b' stands for virtual position of taking the fault of the upright drill core to the position of passing through the center of drill core and keeping its occurrence, c'd' stands for virtual position of taking the minelayer/stratum of the upright drill core to the position of passing through the center of drill core and keeping its occurrence, and a'b' and c'd' are on the same horizontal plane.

FIG. 32-a shows original position of fault and/or minelayer/stratum, which are/is not through the center of core, and the occurrence of minelayer/stratum that is contacted with the bottom/top surface of fault, are visible.

FIG. 32-b shows the fault, and/or minelayer/stratum of FIG. 3-2-a are/is moved to the virtual positions c'd'.

FIG. 32-c shows original position of fault and/or minelayer/stratum, which are/is not through the center of core, and the occurrence of minelayer/stratum, which are contacted with the bottom/top surface of fault, are not visible in core, but, the occurrence of minelayer/stratum/ore body near the fault in the drill core pieces, or in the adjacent drill core pieces which can be well put together with the drill core piece where this fault exists, are visible.

FIG. 32-d shows the fault, and/or minelayer/stratum of FIG. 3-2-c are/is moved to the virtual positions c'd'.

FIG. 34 shows the relation types between faults/minelayers/stratum in upright and oblique cores, in which, (1) on the top horizontal plane of drill core, if the strike of fault/minelayer/stratum is not through the center, move the minelayer/stratum to the virtual location of passing through the center of drill core and keeping its occurrence, (2) the plane ACVU is the top horizontal plane on upright cylinder 2, O is the center of plane ACVU, OA is perpendicular to OC, OA is perpendicular to OU, OA and OV are on a straight line, (3) oblique cylinder 1 is formed by rotating upright cylinder 2; the specific method is to hold the position of line UOC unchanged, and make point A lift angle r to reach point E, and point V fall angle r to reach point X; ECXU is the top surface of oblique cylinder 1, (4) point B is on arc UAC, OA is the direction of the azimuth of core, OB is the strike of minelayer/stratum, (5) OBI is the stratum/minelayer, point I is the intersecting point of minelayer/stratum labeled as OBI and the vertically section along direction OC on the side surface of upright cylinder, 2, ∠OCI=90°, set ω' the true strike of the minelayer/stratum, α'$_m$ the true dip angle of the minelayer/stratum along the direction perpendicular to OB, (6) point F and J are respectively the corresponding points of point B and I on the oblique cylinder 1, OFJ is the minelayer/stratum of oblique cylinder 1, (7) the intersecting line of OFJ and the top horizontal plane of upright cylinder 2 is OK, it is the strike of the minelayer/stratum labeled as OFJ in oblique cylinder 1, the dip angle of the minelayer/stratum along the direction perpendicular to OK is the true dip angle α$_m$ of the minelayer/stratum in the oblique cylinder, (8) Let α$_{mo}$=α$_m$, (9) M is the intersecting point formed by point F vertically falling to plane ACVU, (10) UGC is the intersecting line of the side surface of oblique cylinder 1 and the plane extended by UACV, G is the intersecting point of OA extended line with oblique cylinder 1 on the side surface of oblique cylinder 1, (11) H is the intersecting point of the straight line passing through point F and parallel to EG with arc UGC, (12) R is on line FH or on the line extended by FH, FR=CJ, (13) point D is the intersecting point of line CO with the straight line passing through point B and parallel to AO, on plane XUEC, FQ is parallel to DO, (14) FP⊥OK, FP is the inclination line direction of the minelayer/stratum labeled as OFJ in oblique cylinder 1, (15) point N is the intersecting point of line BC and OK, (16) D, M, B, H four points are on a straight line, (17) L is the intersecting point of line OK and arc UGHC, (18) W is the intersecting point of the line extended by OB and arc UGHC, (19) O, P, N, K, L five points are on a straight line, (20) point T is the intersecting point of line BO or extended by BO with the line perpendicular to BO or BO extended line passing through point C, (21) C, K, H three points are on a straight line.

FIG. 34-a is the schematic diagram of A set of formulas group.

FIG. 34-b is the schematic diagram of B set of formulas group.

FIG. 34-c is the schematic diagram of C set of formulas group.

FIG. 36 shows the azimuth of the vertical projection line of line MF from the point meeting minelayer/stratum to the point meeting fault in drill hole on the horizontal plane.

FIG. 37 shows analytic relations between fault and minelayer/stratum.

FIG. 37-a shows analytic relations between fault and minelayer/stratum in the section along direction MF.

FIG. 37-b shows analytic relations between fault and minelayer/stratum in the section perpendicular to the broken ore/rock intersecting line and passing through point F.

FIG. 37-c shows the distance and direction from the point meeting fault in drill hole to the broken ore/rock intersecting line in the section perpendicular to r$_3$ on plan.

FIG. 38 is the schematic diagram for the virtual intersecting point of the axis of the virtual straight hole passing through point F and the virtual minelayer/stratum that did not appear in drill hole because of the cutting of fault.

DETAILED DESCRIPTION OF THE EXAMPLES

Example 1

Figures 14, 15, 16, 17, 18:
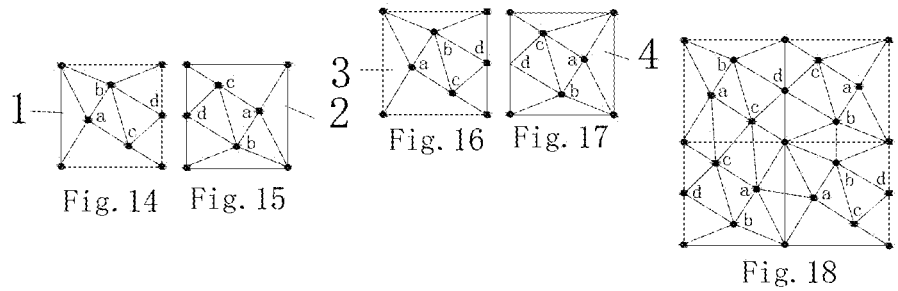
FIG. 14 is the schematic diagram of the basic unit 1 in example 3.
FIG. 15 is the schematic diagram of rotary unit 1 in example 3.
FIG. 16 is the schematic diagram of rotary unit 2 in example 3.
FIG. 17 is the schematic diagram of rotary unit 3 in example 3.
FIG. 18 is the schematic diagram of matching unit in example 3.

The steps of example 1 are as follows:

1 There are various types of state regulations networks for coal exploration, such as China, if the stability of coal layer is medium, and the structural complexity is also medium, then, the spacings of neighboring exploratory lines and exploratory drill holes for proved reserves is 250~500 meters, the spacing commonly used is 500 meters, its twice as 1000 meters.

2 Shown in FIG. 1, (1) four sampling points are respectively arranged at four vertexes of basic square, the plane coordinates for the four vertexes respectively are (0, 0), (1000, 0), (1000, 1000) and (0, 1000); (2) three sampling points are dispersed within basic square, the plane coordinates of points a, b and c respectively are a(200, 200), b (500, 800), c (800, 500); (3) join the above three sampling points a, b and c by triangle; (4) select a vertex from the four vertexes of the basic square; the sum of distances from the selected vertex point to two adjacent sampling points of triangle vertexes inside the square shall be minimum, then, join the three sampling points by triangle; (5) respectively make the joint lines from the other three vertexes of basic square to a nearest sampling points of triangles vertexes inside the square. Then, the basic unit 1 is formed.

3. Rotary unit 1 is generated by counterclockwise rotating basic unit 1 for 90 degrees from its original position, shown in FIG. 2; rotary unit 2 is generated by counterclockwise rotating basic unit 1 for 180 degrees from its original position, shown in FIG. 3; and rotary unit 3 is generated by counterclockwise rotating basic unit 1 for 270 degrees from its original position, shown in FIG. 4.

4. Referring to FIG. 5, the rotary unit 1 is joined to the base of basic unit 1, the rotary unit 3 is joined to the right side of basic unit 1, and the rotary unit 2 is joined to the right side of rotary unit 1 and the base of rotary unit 3; at the same time, make the sampling points at the vertexes of two adjacent units coincided. Then, join the sampling points of triangle vertexes, which are on both sides of common edge of adjacent two units, and make the minimum angle larger among the 6 interior angles in two adjacent triangles, the length of the joint lines 0.20~0.85 times of basic square side length, and make the distribution of sampling points more stagger and dispersed. Later, remove the lines between two adjacent vertexes of square. In this way, a square matching unit is connected.

5. Shown in FIG. 6, using matching unit as reproducing unit, translate and replicate matching unit in exploration area; at the same time, make the sampling points at the vertexes of two adjacent matching units coincided. Then, join the sampling points, which are on both sides of common edge of two adjacent matching units, and make the minimum angle larger among the 6 interior angles in two adjacent triangles, the length of the joint lines 0.20~0.85 times of basic square side length, the distribution of sampling points more stagger and dispersed. Finally, remove the lines between two adjacent vertexes of squares, to form initial rotary network. The network can be also suitable for horizontal exploration. Respectively choosing one unit from 4 units in the matching unit as starting unit of initial rotary network, 4 subsets programs of initial rotary network can be obtained. Then, a scheme is selected from the 4 subsets schemes according to the specific situation.

6 Drill holes are arranged at the sampling points (namely, nodes) of initial exploration network 7 Determinations of the strike and dip direction of stratum or minelayer, and fault occurrence based on the data from loggings and non-oriented cores 7.1 Determinations of the roughly strike and dip direction of minelayer/stratum Given: The $7^{th}$ Drill hole is a non-oriented drill hole, there is a fault in a drill core, the bedding and surface of siltstone layer, which are contacted with the bottom surface of fault, are invisible, but, the drill core with the neighboring drill core piece, below the drill core piece where the fault exists, can be well put together; and on the neighboring drill core piece, there is a tuff layer at the distance of 0.6 meter from the bottom surface of fault. Take the cores upright, on the upright cores put together, the dip angle of tuff layer is 23 degrees, namely, $\alpha'_m=23°$; the dip angle of fault is 50 degrees, namely, $a'_f=50°$; the angle between tuff layer strike and fault strike is 25 degrees, namely, $\theta=25°$; fault strike is greater than tuff layer strike; the dip directions of tuff layer and fault are not opposed; the zenith of this drill core piece is 20 degrees, namely, $r=20°$; the azimuth of this drill core piece is 50 degrees, namely, $v=50°$.

Firstly, we plot a local structure contour map for tuff layer bottom in the range which contains the drill hole meeting fault and adjacent drill holes according to these drill holes data on one side of roughly strike of this tuff layer. Then, plot another local structure contour map on another side. At last, take the dip angle 35°, roughly strike 101° and roughly dip directions 191° from the rational group of two groups of dip angles, roughly strikes and roughly dip directions of tuff layer in the two local maps as dip angle $\alpha_{mo}$, the roughly strike $OL_o$ and roughly dip directions of siltstone layer, namely, $\alpha_{mo}=35°$, $OL_o=101°$, inclination is about 191°.

7.2 Determinations of the strike and dip direction of tuff layer, and fault occurrence Solve: the problem is solved in two steps 7.2.1 The first step is to determine the strike and dip direction of tuff layer According to the known conditions, this situation belongs to the type 33-a, but, it is unknown to choose which one of 33-a1/33-a2. Therefore, determine respectively by using A and B sets of formulas groups.

The computing results from A set of formulas group are:

7.2.1.1 By using MatLay. software to solve A1 set of formulas group, obtain angle $\angle AOB_m$ between the strike of siltstone layer and the azimuth of drill core on the upright core.

Given: $r=20°$, $\alpha'_m=23°$, $\alpha_{mo}=35°$, OA=OB=OF=OE=OC=OU=R, got: $\angle AOB_m=20°$ 7.2.1.2 Solve angle $\angle AOK_m$ between tuff layer strike and the azimuth of drill core, using A2 set of formulas group.

Known: $\angle AOB_m=20°$, OA=OB=OF=OE=OC=OU=R, $r=20°$, $\alpha'_m=23°$, $\alpha_m=\alpha_{mo}=35°$, got: $\angle AOK_m=50.18227284°$ 7.2.1.3 Verify the results using formula (30) and formula (31) respectively.

The $\angle MOK$ determined from A3 is equal to the $\angle MOK$ determined from A2, then, the $\angle AOB_m$ determined from A1 and $\angle AOK_m$ determined from A2 are valid. Because the computing results from B set of formulas group did not pass verification, the computing results from A set of formulas group are adopted.

The strike and dip direction of tuff layer in drill 7:

Tuff layer strike=the azimuth of drill hole core+$\angle AOK_m=50°+50.18227248°=100.18227248°$ Tuff layer dip direction=100.18227248°+90°=190.18227248°

7.2.2 The second step is to determine the strike, dip direction and dip angle of fault.

Known: $\alpha'_f=50°$, $r=20°$, $\theta=25°$,

Since the angle between the fault and tuff layer strike is 25 degrees, the strike of fault is greater than that of tuff layer strike, then, $$\angle AOB_f=|\theta+\angle AOB_m|=25°+20°=45°$$

Since the azimuth of drill hole core is 50°, tuff layer strike is 100.18227248°, and the dip directions of fault and tuff layer are not opposed, then, the case belongs to type 33-a1, the A set of formulas group is adopted for computing.

Got: $\angle AOK_f=53.38074745°$

The $\angle MOK$ determined from formulas (30) and (31) is equal to the $\angle MOK$ determined from formula (20), then, $\angle AOK_f$ is valid.

The occurrence of fault meeting in drill hole 7:

Fault Strike=v+$\angle AOK_f=50°+53.38074745°=103.38074745°$

Fault dip direction=103.38074745°+90°=193.38074745°

Fault dip angle=65.24374125°

Figure 40:
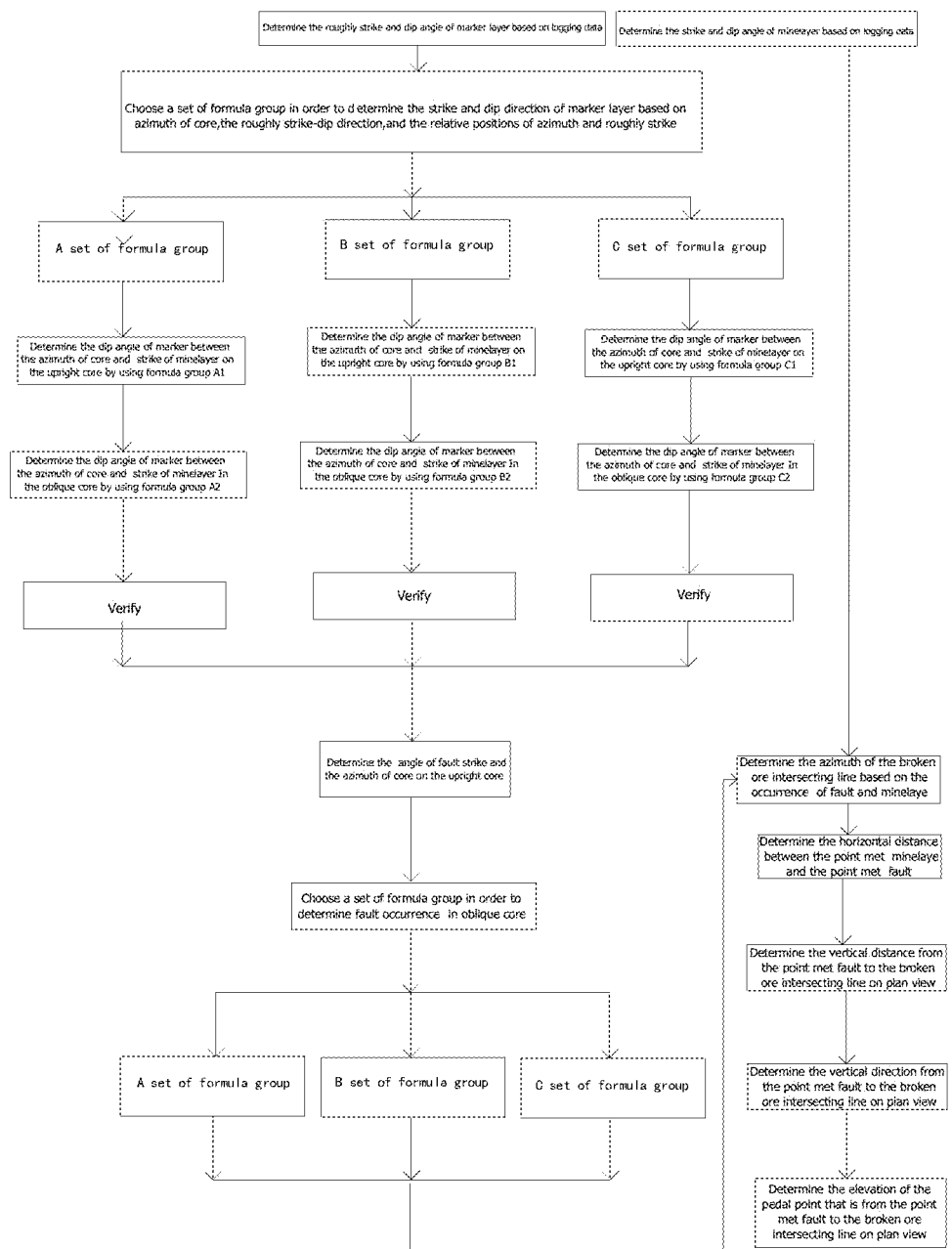
FIG. 40 is the algorithm process diagram for determining the strike, dip direction of minelayer/stratum, and fault occurrence based on the data from loggings and non-oriented cores, the distance and direction from the point meeting fault in drill hole to the broken ore/rock intersecting lines on plan, and the elevation of intersecting point of fault and minelayer/stratum.

8 Determinations of the distance and direction from the point meeting fault in drill hole to broken ore/rock intersecting lines on the exploration works plan based on the occurrences of minelayer, stratum and fault 8.1 Determinations of the shortest distance and direction from the point meeting fault in drill hole to the broken ore/rock intersecting lines on plan Shown in FIG. 40, the $13^{th}$ drilling met F5 fault and the $8^{th}$ coal layer. After the study, fault F5 is a normal fault, and the $8^{th}$ coal layer meeting in the $13^{th}$ drill hole is in the footwall of F5. The loggings data and the occurrences of fault and 8th coal layer meeting in the $13^{th}$ drill hole are respectively, Given: $x_f=5237325.31$, $y_f=22596248.12$, $z_f=-510.87$, $x_m=5237341.25$, $y_m=22596263.54$, $z_m=-588.23$, $\alpha=25°$, $\beta=67°$, $Q_f=150°$, $Q_m=250°$ Determine: the vertical distance and direction from the point meeting fault in drill hole to the broken ore intersecting lines.

Solve: $\omega_{f1}=150-90°=60°$, $\omega_{m1}=250-90°=160°$, $\omega_1=\omega_{m1}-\omega_{f1}=160-60°=100°$, $\omega=180-\omega_1=80°$ since $|Q_m-Q_f|>90$, namely, the dip directions of fault and siltstone layer are opposed, $\beta>\alpha$, then, $$r = \arctan(\sin\omega\tan\alpha/\tan\beta + \cos\omega\tan\alpha) \quad (39)$$
$$= \arctan(\sin 80°\ \tan 25°/\tan 67° + \cos 80°\ \tan 25°)$$
$$= 10.6750°$$

Since $\omega_1 > 90$, $\omega_{m1} > \omega_{f1}$, then, $r_o = \omega_{f2} - r = 60 - 10.6750° = 49.328°$ $$\text{Tan } v = |(y_f - y_m)/(x_f - x_m)| = |(22596248.12 - 22596263.54)/(5237325.31 - 5237341.25)| = 0.9674 \quad (41)$$

$v = 44.0507°$

Since $x_m > x_f$, $y_m > y_f$, $\delta = 180° + v = 180° + 44.0507° = 224.0507°$, let $r_3 = r_o$ $$\alpha_1 = \arctan(\tan\alpha|\cos|Q_m - \delta||) = \arctan(\tan 25°|\cos|250° - 224.05||) = 22.7483° \quad (42)$$

$$\alpha_2 = \arctan(\tan\alpha|\cos|Q_m - r_o||) = \arctan(\tan 25°\cos|250° - 49.328°|) = 23.571° \quad (44)$$

$$\beta_2 = \arctan(\tan\beta|\cos|Q_f - r_o||) = \arctan(\tan 67°\cos|150° - 49.328°|) = 23.571° \quad (45)$$

According to the known condition, we conclude that this case belongs to the type of $Z_f > Z_m$, $Q_f - \delta < 90°$, $r_o < Q_m$, $r_o > Q_f$, $\beta > \alpha_2$, the parameters of the broken ore intersecting line of the footwall are:

$$L_{mf} = 22.1779 \text{ meters} \quad (40)$$

$$Q_{mf} = 578.931 \text{ meters} \quad (46)$$

$$L_f = |(z_f - z'_m)/(\tan\beta_2 + \tan\alpha_2)| = 78.986 \text{ meters} \quad (47)$$

Since, $|49.328 + 90 - 150| = 10.672° < 90°$, then, adopt,
$$\omega_3 = 139.328° \quad (48)$$

$$z_{mf} = z_f - L_f \tan\beta_2 = -545.331 \text{ meters} \quad (49)$$

In the $13^{th}$ drill hole, the $8^{th}$ coal layer doesn't appear in the hanging wall of F5 fault, the elevation at the virtual intersecting point of the $8^{th}$ coal layer of the hanging wall of F5 fault and the virtual drill axis passing through the point meeting F5 fault is −594.735 meters according to the throw of F5 fault, namely, $z'_m = -594.735$ meters, then, the parameters of the broken ore intersecting line of the hanging wall are:

$$L_f = |(z_f - z'_m)/(\tan\beta_2 + \tan\alpha_2)| = 96.113 \text{ meters}$$

$$\omega_3 = 49.328° + 90° = 139.328°$$

$Z_{mf}$ should be calculated based on the specific situation of the $8^{th}$ coal layer in the hanging wall of F5 fault.

Figure 39:
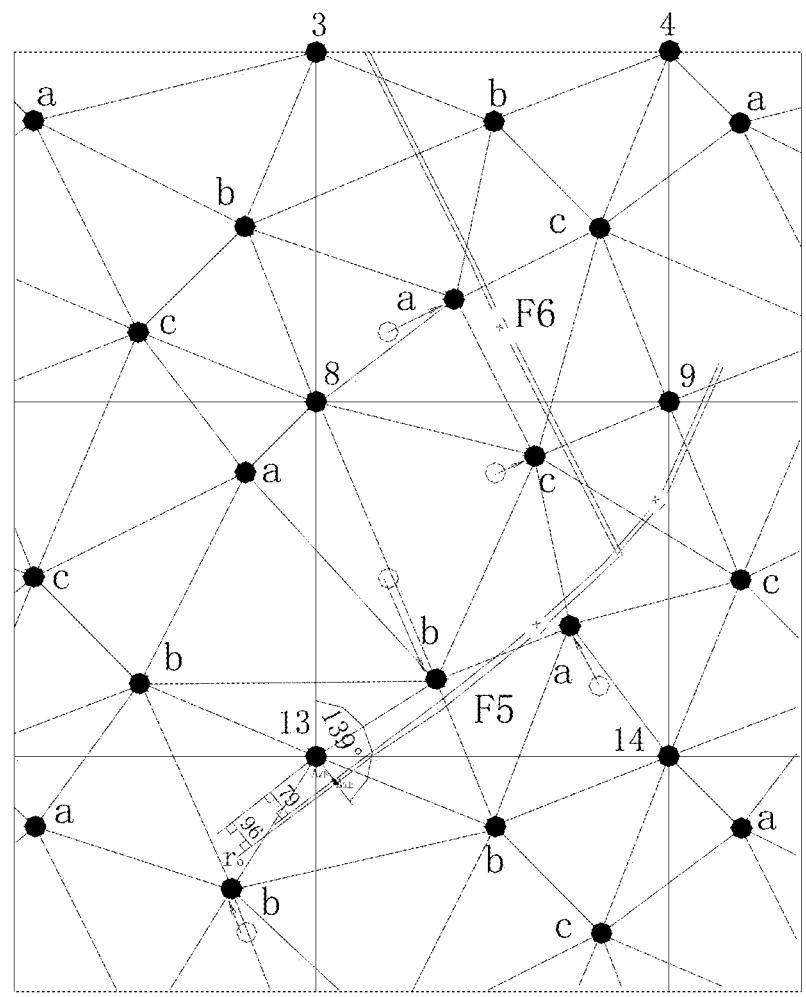
FIG. 39 is a schematic diagram for an example.

8.2 Shown in FIG. 39, in an exploration area, the $1^{st} \sim 25^{th}$ drillings at the nodes of square network are the first batch of drillings, drillings a, b, c of each grid will be drilled after the first batch of drillings has been drilled. The distribution of the $8^{th}$ coal layer is stable in the exploration area. The $9^{th}$ and $13^{th}$ drillings met fault that is determined as F5 fault by comparative studying, and its throw is large. After determining respectively the shortest distance and direction from the point meeting fault in the $9^{th}$ and $13^{th}$ drillings to the broken ore intersecting lines on plan, the intersecting lines of F5 fault and the $8^{th}$ coal layer at the $9^{th}$ and $13^{th}$ drillings, can be directly drawn, on the exploration works plan. Take the intersecting lines directions as tangent directions, respectively join the intersecting lines of F5 fault and the $8^{th}$ coal layer in the hanging wall/footwall of F5 fault at the $9^{th}$ and $13^{th}$ drillings, by using smooth curves. In order to track and control F5 fault, adjust drilling b of grid 8-9-13-14 from original (200, 500) to (331.67, 213.33) based on the positions of the intersecting lines, the position is relative to the $13^{th}$ drilling; temporarily adjust drilling a of grid 8-9-13-14 from original (800, 200) to (713.33, 363.33) based on the positions of the intersecting lines, the positions are also relative to 13 drilling; then, adjust drilling a again, according to the situations that drillings b and a have be drilled. The positions of a, b, c drillings within the other grid can be adjusted by the same method. All intersecting lines of exploration network are changed with the position adjusting of drillings.

9 Construct the three-dimensional visualized simple models of geological exploration area according to the data from cores and loggings, and the occurrences of faults, minelayers, stratum and ore bodies determined from 7. In the models, compare and uniformly number faults, minelayers, stratum, or ore bodies, determine the relationships of cuttings and pinches between faults. Based on this basis, make three-dimensional high-precision geological exploration models, then, cut any sections based on the high-precision models.

10 Based on the correct relationships of cuttings and pinches between faults, and the directions of the broken ore/rock intersecting lines at intersecting points, we can better join the broken ore/rock intersecting lines by taking the directions of the broken ore/rock intersecting line as tangential directions. Then, on the side of triangles of exploration network within the same fault block, use interpolation method to obtain the elevations and strikes of interpolated points, smoothly join adjacent points of equal height by taking the strikes as tangential directions, and join adjacent outcrop points, to form the structure contour map for bottom/top surface of minelayer/stratum/ore body.

11 Produce the sections along the directions of strike, dip direction and any other directions according to the contour maps for bottom/top surface of minelayer/stratum/ore body.

12 According to a whole set of contour maps for bottom surface of minelayers/stratum and sections, we produce the three-dimensional visualized good models of geological exploration area, to complete geological exploration works.

Example 2

Specific Examples 2

Shown in FIGS. 8 to 13, the difference between this example and example 1 is: in step 2, the three sampling points dispersed within the basis square are respectively, a (300, 300), b (400, 750), c(800, 400). Other steps are the same with example 1.

Example 3

Shown in FIGS. 14 to 19, the difference between this example and example 1 is: in step 2, (1) arrange one sampling point at the midpoint of right side of the square, the total of sampling points are eight, shown in FIG. 14, the eight sampling points are respectively (0, 0), (1000, 0), (1000, 1000), (0, 1000), a (277, 454), b (500, 800), c (679, 200), d (1000, 500). (2) respectively join the sampling points from the midpoint of right side of the basic square to the two adjacent sampling points of triangle vertexes inside the square, (3) respectively join the sampling points from the two vertexes of basic square on the same straight line with the midpoint of right side of the basic square to a adjacent sampling point of triangle vertexes inside the square, (4)

respectively join the sampling points from the other two vertexes of basic square to the two adjacent sampling points of triangle vertexes inside the square, at the same time, remove the longest joint line, among the four joint lines. In step 3, (1) counterclockwise rotate the basic unit 1 for 180 degrees to form rotary unit 1, (2) counterclockwise rotate the basic unit 1 for 360 degrees to form rotary unit 2, (3) counterclockwise rotate the basic unit 1 for 540 degrees to form rotary unit 3. In step 5, hold these lines unchanged, between the two square vertexes nearest to the midpoints of sides of basic units or rotary units. Other steps are the same with example 1.

Example 4

Shown in FIGS. 26 to 31, the difference between this example and example 3 is: in step 2, (1) shown in FIG. 26, the eight sampling points are respectively (0, 0), (1000, 0), (1000, 1000), (0, 1000), a (200, 450), b (450, 800), c (550, 200), d (1000, 500), (2) respectively join the sampling points from the other two vertexes of basic square to the two adjacent sampling points of triangle vertexes inside the square, but, do not remove any joint line among the four joint lines, shown in FIG. 26. In step 3, shown in FIG. 27, unit 2 is formed by mirroring symmetrically about the right side of basic unit 1; shown in FIG. 28, splicing body A1 is formed by splicing unit 2 to the right side of basic square; shown in FIG. 29, counterclockwise rotate splicing body A1 for 180 degrees to form splicing body A2; in step 4, shown in FIG. 30, the matching unit is formed by splicing the splicing body A2 to the right side of splicing body A1. Other steps are the same with example 3.

Example 5

Figures 19, 20, 21, 22, 23:
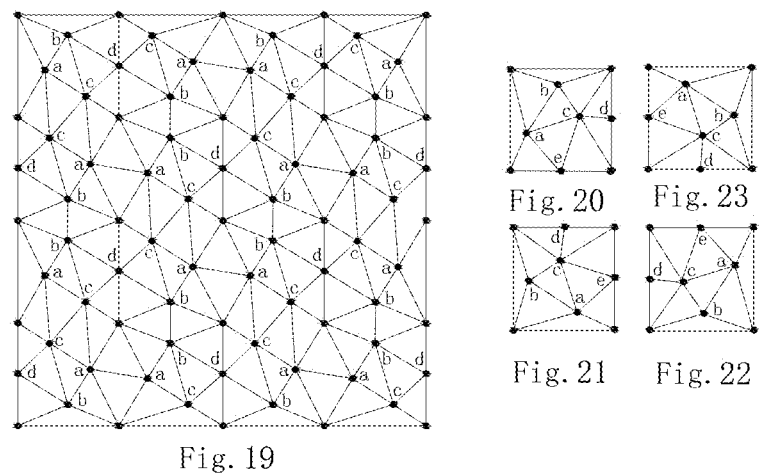
FIG. 19 is the schematic diagram of initial exploration networks made by translating and replicating the matching unit of FIG. 8.
FIG. 20 is the schematic diagram of the basic unit 1 in example 5.
FIG. 21 is the schematic diagram of rotary unit 1 in example 5.
FIG. 22 is the schematic diagram of rotary unit 2 in example 5.
FIG. 23 is the schematic diagram of rotary unit 4 in example 5.
Figures 24, 25:
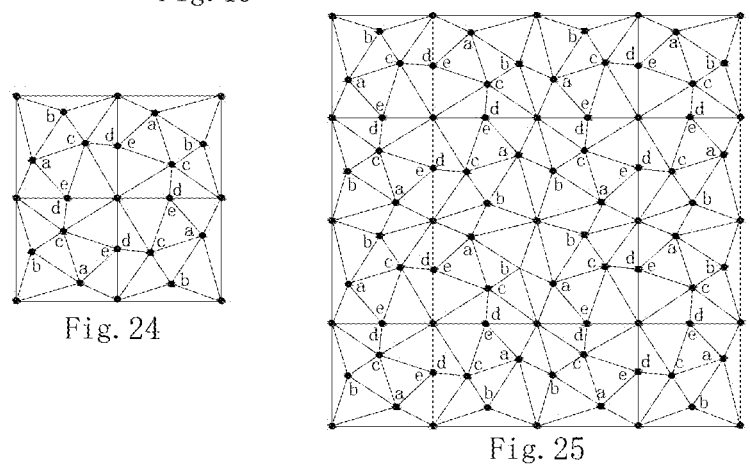
FIG. 24 is the schematic diagram of matching unit in example 5.
FIG. 25 is the schematic diagram of initial exploration networks made by translating and replicating the matching unit of FIG. 24.
Figure 33:
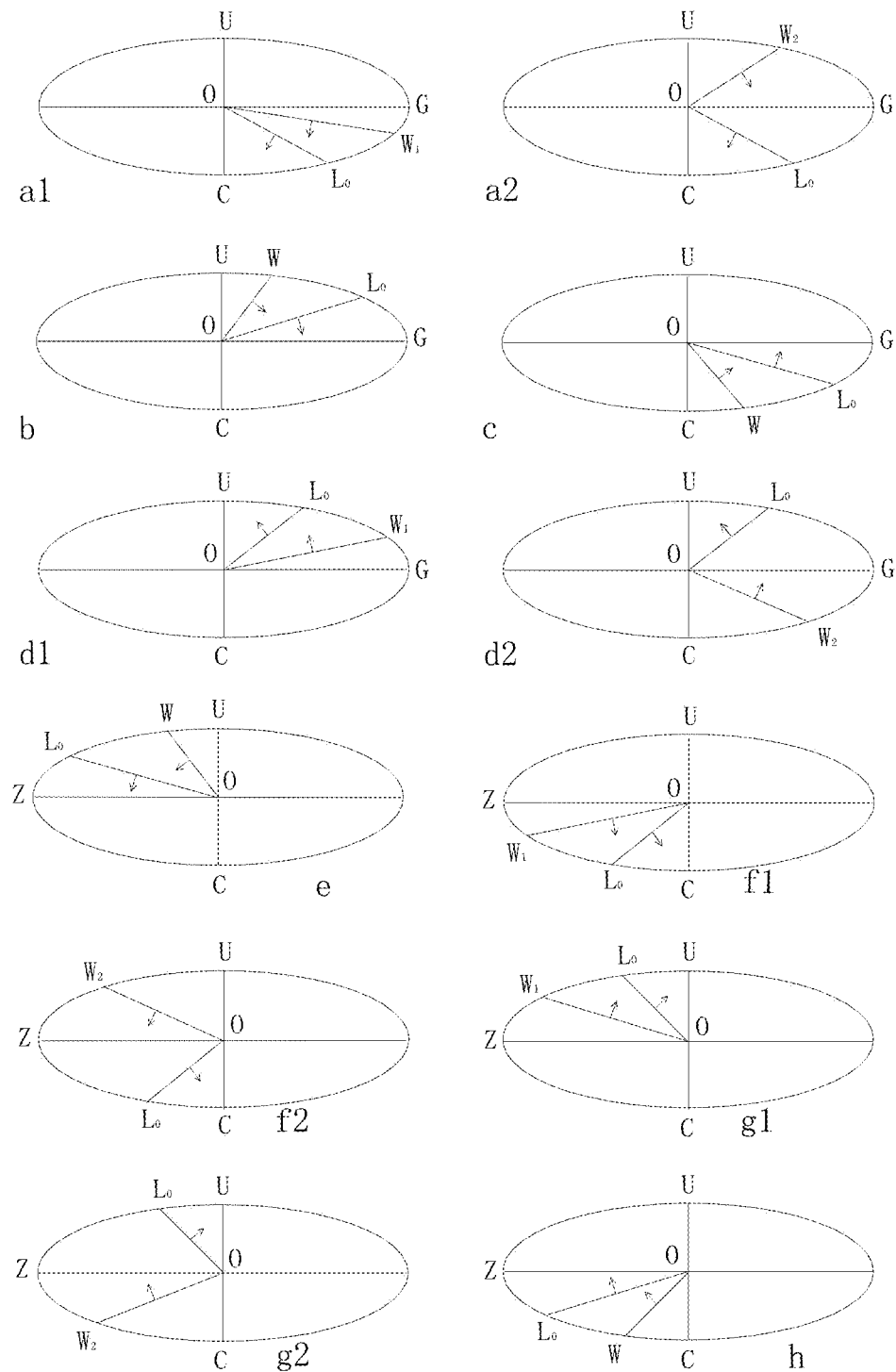
FIG. 33 shows the relation types between the azimuth of drill core and the roughly strikes of the marker layers, respectively in oblique and upright drill core. On the plan, OG and OZ respectively stand for the direction of v in the two types conditions, OW is ω', $OW_1$ is a possibility of ω', OW$_2$ is another possibility of ω', OL$_o$ is the rough direction of line OK in oblique core, namely, the rough strike of the minelayer/stratum.
Figure 35:
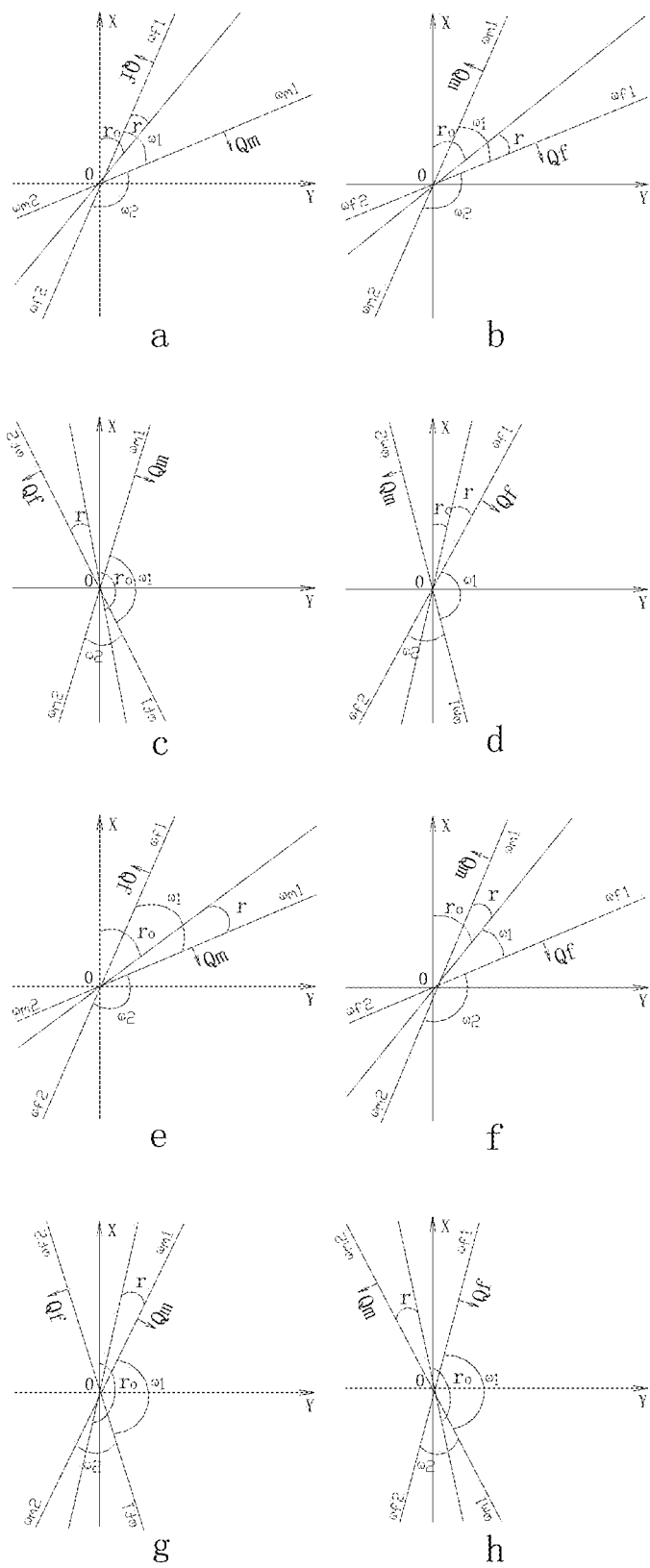
FIG. 35 shows relation types between broken ore/rock intersecting line with the strikes of fault and minelayers/stratum.
Figure 35:
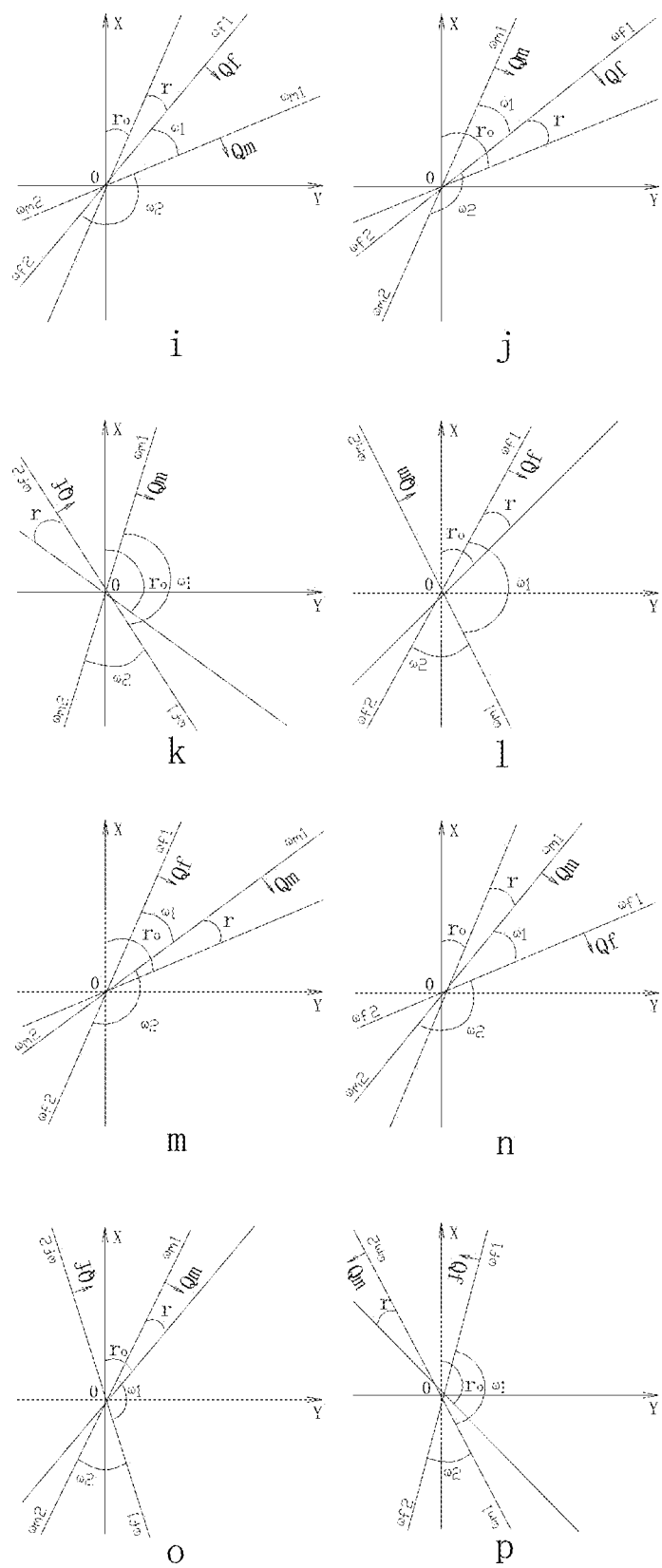

Shown in FIGS. 20 to 25, the difference between this example and example 1 is: in step 2, (1) arrange respectively one sampling point at the midpoints of right side and bottom side of the square, the total of sampling points are nine, shown in FIG. 20; the nine sampling points respectively are (0, 0), (1000, 0), (1000, 1000), (0, 1000), a (171, 363), b (472, 832), c (672, 530), d (1000, 500), e (500, 0), (2), join the nine sampling points by triangles, and choose the shorter line in the crossing joint lines. In step 4 and 5, the sampling points at midpoints of common edges of two adjacent units are also coincided, and make the length of the joint lines 0.35~0.71 times of basic square side length. Other steps are the same with example 1.

Example 6

The difference between this example and example 1 is: in step 2, there is step A between step 5 and 6 in example 1, 2, 3, 4 or 5, zooming the length or width of matching unit to form a rectangular network, all locations of internal sampling points are adjusted based on zoom scale. Other steps remain the same with the original example.

The invention claimed is:
1. A geological exploration method, comprising:
determining the side length of a basic square based on an analysis method and encryption method and mathematical statistic method and dilution method, or using two times the side length of a square exploration network;
arranging four sampling points a, b, c and d respectively at four vertexes of the basic square; dispersing three sampling points within the basic square; joining the above three sampling points a, b and c by a triangle; selecting a vertex from the four vertexes of the basic square; minimizing the sum of distances from the sampling point arranged at the selected vertex of the basic square to two adjacent sampling points of triangle vertexes inside the basic square; and joining the three sampling points by triangle;
respectively making joint lines from the other three vertexes of the basic square to a respective nearest sampling point of triangle vertex inside the basic square; and forming a basic unit;
generating a basic rotary unit by counterclockwise rotating the basic unit for 90 degrees from an original position; generating a second rotary unit by counterclockwise rotating the basic unit for 180 degrees from an original position; and generating a third rotary unit by counterclockwise rotating the basic unit for 270 degrees from its original position;
joining the basic rotary unit to the base of the basic unit, joining the third rotary unit to the right side of the basic unit, and joining the second rotary unit to the right side of the basic rotary unit and the base of the third rotary unit; at the same time, making the sampling points at the vertexes of two adjacent units coincide; then, joining the sampling points of triangle vertexes which are on both sides of a common edge of adjacent two units, and making the minimum angle larger among six interior angles in two adjacent triangles, such that the length of the joint lines is between 0.20 and 0.85 times of the basic square side length, and making the distribution of sampling points more staggered and dispersed;
removing the lines between two adjacent vertexes of the basic square and thereby connecting a square matching unit comprising four units, specifically the basic unit, the basic rotary unit, the second rotary unit, and the third rotary unit;
using a matching unit as a reproducing unit, and translating and replicating the matching unit in an exploration area; at the same time, make the sampling points at the vertexes of two adjacent matching units coincide;
joining the sampling points which are on both sides of the common edge of two adjacent matching units, and making the minimum angle larger among the 6 interior angles in two adjacent triangles, the length of the joint lines is between 0.20 and 0.85 times of the basic square side length, the distribution of sampling points is more staggered and dispersed;
removing the lines between two adjacent vertexes of squares to form an initial rotary network; wherein the initial rotary network can be also suitable for horizontal exploration; respectively choosing one unit from the four units in the matching unit as starting unit of initial rotary network, and obtaining 4 subset programs of the initial rotary network; then, selecting a program from the 4 subset programs,
exploratory wells or drill holes are arranged at the sampling points of initial exploration networks;
determining the strike and dip direction of mine layer and stratum, and fault occurrence based on the logging and non-oriented cores from one drill hole that met fault, and the loggings from adjacent drill holes;
determining the strike and dip direction of marker layer which is contacted or virtually contacted with the bottom/top surface of fault, and fault occurrence;

determining the strike and dip direction of marker layer which is contacted or virtually contacted with the bottom and top surface of fault;

contacting the attitude of mine layer and stratum, and determining whether the attitude of the mine layer and stratum, which is contacted with the bottom and top surface of fault, is visible in a core when the attitude of the mine layer and stratum is visible in the core, if the strike of fault and marker layer on the horizontal top surface of oblique drill core is not through the center of core, taking the drill core upright, and taking the marker layer and fault to the virtual position which is through the center of core and keeping its attitude;

when the attitude of mine layer and stratum, which is contacted with the bottom and top surface of fault, is invisible in the core taking the drill core upright, and taking the mine layer and stratum and ore body near the fault in the core pieces, or in the adjacent core pieces which are put together with the core piece where the fault exists, to the virtual position passing through the center of core and keeping its attitude;

plotting a local structure contour map for bottom surface of marker layer in the range, adjacent to the drill hole which met fault, according to the bottom elevations of this marker layer in this drill hole and adjacent drill holes, on one side of roughly strike of marker layer; then, plotting another local structure contour map on another side; at last, choosing the rational group of two groups dip angles, roughly strikes and roughly dip directions in two maps, as dip angle $\alpha_{mo}$, roughly strike $OL_o$ (wherein $OL_o$ is the rough direction of a line in the oblique drill core) and roughly dip direction of marker layer;

based on the range of the azimuth v, the roughly dip direction of marker layer, the relative positions of v, $OL_o$ and $\omega'$, $\omega'$ stands for the strike of marker layer on upright core, the formulas group selected for determining the strike and dip direction of marker layer, and fault attitude, can be classified to the A, B and C three sets of formulas groups;

all formulas of A, B and C are from the groups consisting of the following, wherein two-character acronyms indicate line segments between a first point labeled with a first character and a second point labeled with a second character, wherein three-character acronyms preceded by a ∠ symbol indicate an angle defined by a first point labeled with a first character, a second point disposed at a vertex of the angle and labeled with a second character, and a third point labeled with a third character, and wherein acronyms including the name of a trigonometric operation followed by three characters indicate the execution of the trigonometric operation on an angle defined by the points represented by the three characters:

$$\sin FOM = \sin r \cdot \cos AOB_m \quad (1)$$

$$FH = OF \cdot \cos AOB_m \cdot \tan r \quad (2)$$

$$BC^2 = 2R^2 \cdot (1 - \cos(90 - \angle AOB_m)) \quad (3)$$

$$\tan FHK = BC/FH \quad (4)$$

$$\tan DBC = (1 - \sin AOB_m)/\cos AOB_m \quad (5)$$

$$\tan CBI = \tan \alpha'_m \cdot \cos(90 - \angle DBC - \angle AOB_m) \quad (6)$$

$$\angle HFK = 90 - \angle CBI \quad (7)$$

$$FK = FH \cdot \sin FHK/\sin(180 - \angle FHK - \angle HFK) \quad (8)$$

$$\tan COI = \tan \alpha'_m \cdot \cos AOB_m \quad (9)$$

$$\sin BOI = \sin COI/\sin \alpha'_m \quad (10)$$

$$CI = BC \cdot \tan CBI \quad (11)$$

$$OI^2 = R^2 + CI^2 \quad (12)$$

$$BI^2 = BC^2 + CI^2 \quad (13)$$

$$\sin OBI = OI \cdot \sin BOI/BI \quad (14)$$

$$\angle OFK = \angle OBI \quad (15)$$

$$OK^2 = R^2 + FK^2 - 2RFK \cdot \cos OFK \quad (16)$$

$$\sin FOK = FK \cdot \sin OFK/OK \quad (17)$$

$$\sin \alpha_m = \sin FOM/\sin FOK \quad (18)$$

$$\cos PMO = \tan FOM/\tan \alpha_m \quad (19)$$

$$\angle MOK = 90 - \angle PMO \quad (20)$$

$$\sin FKM = R \cdot \sin FOM/FK \quad (21)$$

$$\cos PMK = \tan FKM/\tan \alpha_m \quad (22)$$

$$OM = OF \cdot \cos FOM \quad (23)$$

$$\angle OMK = \angle PMO + \angle PMK \quad (24)$$

$$FM = OF \cdot \sin FOM \quad (25)$$

$$MK^2 = FK^2 - FM^2 \quad (26)$$

$$\sin OKM = OM \cdot \sin OMK/OK \quad (27)$$

$$\cos AOM = \tan FOM/\tan r \quad (28)$$

$$\angle AOK_m = \angle AOM + \angle MOK \quad (29)$$

$$\angle MOK = 180 - \angle OMK - \angle OKM \quad (30)$$

$$\sin MOK = MK \cdot \sin OMK/OK \quad (31)$$

$$BC^2 = 2R^2(1 - \cos(90 + \angle AOB_m)) \quad (32)$$

$$\tan DBC = (1 + \sin \angle AOB_m)/\cos AOB_m \quad (33)$$

$$\tan CBI = \tan \alpha'_m \cdot \cos(90 - \angle DBC + \angle AOB_m) \quad (34)$$

$$BOI = 180 - \arcsin(\sin COI/\sin \alpha'_m) \quad (35)$$

$$\angle AOK_m = \angle MOK - \angle AOM \quad (36)$$

$$\angle OMK = \angle PMO - \angle PMK \quad (37)$$

$$\angle AOK_m = \angle AOM - \angle MOK \quad (38),$$

wherein r is either a lift or a fall angle, $\alpha'_m$ is the true dip angle of the minelayer/stratum along the direction perpendicular to OB, R are the radius of the drill core, $\alpha_m$ is the true dip angle of the minelayer/stratum in the oblique cylinder.

2. A geological exploration method, based on claim 1, further comprising:

arranging respectively one sampling point at the midpoints of the right side and bottom side of the basic square, such that the basic square includes nine sampling points;

joining the nine sampling points by triangles, then, in instances wherein crossing joint lines are formed between sampling points, choosing a shorter line in the crossing joint lines;

the sampling points at midpoint of the common edges of two adjacent units also coincide, and make the length of the joint lines between 0.35 and 0.71 times the length of the basic square side.

3. A geological exploration method, based on claim 2, further comprising:

zooming the length or width of matching unit to form a rectangular network, all locations of internal sampling points are adjusted based on the scale of zoom.

4. A geological exploration method, based on claim 1, wherein one sampling point is arranged at the midpoint of the right side of the basic unit, wherein the sampling points from the midpoint of right side of the basic square are respectively joined to the two adjacent sampling points of triangle vertexes inside the basic square, wherein the sampling points from the two vertexes of the basic square which are on the same straight line with the midpoint of the right side of the basic square are respectively joined to an adjacent sampling point of triangle vertexes inside the basic square, wherein the sampling points from the other two vertexes of the basic square are respectively joined to the two adjacent sampling points of triangle vertexes inside the basic square wherein, at the same time, the longest joint line among the four joint lines is removed, wherein the basic unit is formed and rotated counterclockwise 180 degrees for the basic unit to form the basic rotary unit, rotated counterclockwise 360 degrees for the basic unit to form the second rotary unit, rotated counterclockwise 540 degrees for the basic unit to form the third rotary unit; wherein the sampling points at midpoint of the common edges of two adjacent units are also coincided; and wherein the lines between the two vertexes of the basic square nearest to the midpoints of side of the basic rotary unit are held unchanged, but other lines between two adjacent vertexes of the basic square are removed.

5. A geological exploration method, based on claim 4, further comprising prior to forming and rotating the basic unit, respectively joining the sampling points from the other two vertexes, which are not on the same straight line with the midpoint of the right side of the basic square, to the two adjacent sampling points of triangle vertexes inside the basic square, without removing any joint line among the four joint lines in a following step, a second unit is formed by mirroring the basic unit symmetrically about the right side of the basic unit, a first splicing body is formed by splicing the second unit to the right side of the basic square, wherein the first splicing body is rotated counterclockwise 180 degrees to form a second splicing body; and in a following step, the matching unit is formed by splicing the second splicing body to the right side of the first splicing body.

* * * * *